(12) United States Patent
Zhang et al.

(10) Patent No.: US 10,506,230 B2
(45) Date of Patent: Dec. 10, 2019

(54) MODIFIED ADAPTIVE LOOP FILTER TEMPORAL PREDICTION FOR TEMPORAL SCALABILITY SUPPORT

(71) Applicant: QUALCOMM Incorporated, San Diego, CA (US)

(72) Inventors: Li Zhang, San Diego, CA (US); Wei-Jung Chien, San Diego, CA (US); Marta Karczewicz, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 15/861,165

(22) Filed: Jan. 3, 2018

(65) Prior Publication Data

US 2018/0192050 A1      Jul. 5, 2018

Related U.S. Application Data

(60) Provisional application No. 62/442,322, filed on Jan. 4, 2017, provisional application No. 62/445,174, filed on Jan. 11, 2017.

(51) Int. Cl.
*H04N 19/31* (2014.01)
*H04N 19/117* (2014.01)
(Continued)

(52) U.S. Cl.
CPC .......... *H04N 19/117* (2014.11); *H04N 19/80* (2014.11); *H04N 19/17* (2014.11); *H04N 19/70* (2014.11)

(58) Field of Classification Search
CPC .... H04N 19/117; H04N 19/463; H04N 19/31; H04N 19/82; H04N 19/80; H04N 19/17; H04N 19/70

(Continued)

(56) References Cited

U.S. PATENT DOCUMENTS

2011/0069752 A1    3/2011   Watanabe et al.
2011/0216984 A1    9/2011   Tezuka
(Continued)

FOREIGN PATENT DOCUMENTS

EP      2048886 A1      4/2009
EP      2584781 A1      4/2013
KR   20120033289 A      4/2012

OTHER PUBLICATIONS

Zhang et al, Adaptive loop filter with temporal prediction (Year: 2012).*

(Continued)

*Primary Examiner* — Shan E Elahi
(74) *Attorney, Agent, or Firm* — Shumaker & Sieffert, P.A.

(57) ABSTRACT

A video coder may reconstruct a current picture of video data. A current region of the current picture is associated with a temporal index indicating a temporal layer to which the current region belongs. Furthermore, for each respective array of a plurality of arrays that correspond to different temporal layers, the video coder may store, in the respective array, sets of adaptive loop filtering (ALF) parameters used in applying ALF filters to samples of regions of pictures of the video data that are decoded prior to the current region and that are in the temporal layer corresponding to the respective array or a lower temporal layer than the temporal layer corresponding to the respective array. The video coder determines, based on a selected set of ALF parameters in the array corresponding to the temporal layer to which the current region belongs, an applicable set of ALF parameters.

44 Claims, 10 Drawing Sheets

(51) Int. Cl.
*H04N 19/80* (2014.01)
*H04N 19/70* (2014.01)
*H04N 19/17* (2014.01)

(58) Field of Classification Search
USPC .................................................. 375/240.02
See application file for complete search history.

(56) References Cited

U.S. PATENT DOCUMENTS

| | | | | |
|---|---|---|---|---|
| 2012/0230397 | A1* | 9/2012 | Ouedraogo | H04N 19/70 375/240.03 |
| 2012/0243611 | A1 | 9/2012 | Kondo et al. | |
| 2013/0022104 | A1* | 1/2013 | Chen | H04N 19/70 375/240.02 |
| 2013/0022113 | A1* | 1/2013 | Chen | H04N 19/597 375/240.12 |
| 2013/0022122 | A1* | 1/2013 | Oh | H04N 19/56 375/240.16 |
| 2013/0113880 | A1* | 5/2013 | Zhao | H04N 19/70 348/43 |
| 2013/0142267 | A1* | 6/2013 | Esenlik | H04N 19/44 375/240.29 |
| 2013/0182755 | A1* | 7/2013 | Chen | H04N 19/70 375/240.01 |
| 2013/0182779 | A1 | 7/2013 | Lim et al. | |
| 2013/0329789 | A1* | 12/2013 | Wang | H04N 19/463 375/240.12 |
| 2014/0072033 | A1* | 3/2014 | Chuang | H04N 19/70 375/240.02 |
| 2014/0092978 | A1* | 4/2014 | Bugdayci | H04N 19/30 375/240.16 |
| 2014/0133556 | A1* | 5/2014 | Chen | H04N 19/597 375/240.12 |
| 2015/0071356 | A1* | 3/2015 | Kim | H04N 19/513 375/240.16 |
| 2015/0326865 | A1* | 11/2015 | Yin | H04N 19/46 375/240.13 |
| 2017/0237981 | A1 | 8/2017 | Karczewicz et al. | |
| 2017/0237982 | A1 | 8/2017 | Karczewicz et al. | |
| 2017/0238020 | A1 | 8/2017 | Karczewicz et al. | |

OTHER PUBLICATIONS

Yoo et al, Enhanced adaptive loop filter for motion compensated frame (Year: 2011).*
International Search Report and Written Opinion—PCT/US2018/012355—ISA/EPO—dated Mar. 29, 2018.
Joshi R.L., et al., "AHG15: On Reference Picture Set Definition and Signaling," 9th JCT-VC Meeting; 100th MPEG Meeting; Joint Collaborative Team on Video Coding of ISO/IEC JTC 1/SC 29/WG 11 and ITU-T SG 16, Geneva; CH, Apr. 27, 2012-May 7, 2012, URL: http://wftp3.itu.int/AV-ARCH/JCTVC-SITE/, No. JCTVC-I0344, Apr. 17, 2012 (Apr. 17, 2012), XP030112107, pp. 1-7.
Sjoberg R., et al., "JEM Bug Fix for ALF Cross-Picture Prediction," 5th JVET Meeting; The Joint Video Exploration Team of ISO/IEC JTC 1/SC 29/WG11 and ITU-T SG 16, Geneva; CH, Jan. 12, 2017-Jan. 20, 2017, URL: http://phenix.int-evry.fr/JVET/, No. JVET-E0030, Jan. 2, 2017 (Jan. 2, 2017), XP030150494, pp. 1-4.
Sullivan G.J., et al., "Meeting Report of the 5th JVET Meeting," 5th JVET Meeting; The Joint Video Exploration Team of ISO/IEC JTC 1/SC 29/WG 11 and ITU-T SG 16, Geneva; CH, Jan. 12, 2017-Jan. 20, 2017, URL: http://phenix.int-evry.fr/JVET/, No. JVET-E1000, Mar. 30, 2017 (Mar. 30, 2017), XP030150646, pp. 1-103.
Tsai C-Y., et al., "Adaptive Loop Filtering for Video Coding," IEEE Journal of Selected Topics in Signal Processing, vol. 7 (6), Dec. 1, 2013, pp. 934-945, XP055265962, US ISSN: 1932-4553, DOI: 10.1109/JSTSP.2013.2271974, the whole document.
Algorithm Description of Joint Exploration Test Model 1 (JEM1), 113. MPEG Meeting, Oct. 19, 2015-Oct. 23, 2015, Geneva, (Motion Picture Expert Group or ISO/IEC JTC1/SC29/WG11), No. N15790, Dec. 11, 2015 (Dec. 11, 2015), XP030022473.
Alshina E., et al., "Known Tools Performance Investigation for Next Generation Video Coding", 52nd Meeting, Jun. 19 through 26, 2015, Warsaw, Poland; ITU-Telecommunications Standardization Sector, Study Group 16 Question 6, Video Coding Experts Group (VCEG), VCEG-AZ05_r1, Jun. 25, 2015, 7 pp.
Alshina E., et al., "Description of Exploration Experiments on Coding Tools," Joint Video Exploration Team (JVET) of ITU-T SG 16 WP 3 and ISO/IEC JTC 1/SC 29/WG 11, 2nd Meeting: San Diego, USA, Document: JVET-B1011-V2, Feb. 20-26, 2016, pp. 1-5.
An J. et al., "Block partitioning structure for next generation video coding", MPEG doc. m37524 and ITU-T SG16 Doc. COM16-C966-E, Oct. 2015, pp. 1-7.
Bossen F., et al., "HM Software Manual," Joint Collaborative Team on Video Coding (JCT-VC) of ITU-T SG16 WP3 and ISO/IEC JTC1/SC29/WG11, Document: JCTVC-Software Manual, Retrieved on Jun. 18, 2015, pp. 1-27.
Bossen F., "Common Test Conditions and Software Reference Configurations", Joint Collaborative Team on Video Coding (JCT-VC) of ITU-T SG16 WP3 and ISO/IEC JTC1/SC29/WG11, 12th Meeting: Geneva, CH Jan. 14-23, 2013, JCTVC-L1100, 4 Pages.
Chein W.J., et al., "VCEG-AZ10-Extension of Advanced Temporal Motion Vector Predictor", 52nd Meeting, Jun. 19 through 26, 2015, Warsaw, Poland; ITU-Telecommunications Standarization Sector Study Group 16 Question 6 Video Coding Experts Group (VCEG), VCEG-AZ10 powerpoint, Jun. 25, 2015, 4 pp.
Chen et al., "Algorithm Description of Joint Exploration Test Model 6 (JEM 6)," Joint Video Exploration Team, F1001-v2, Mar. 31-Apr. 7, 2017, 48 pp.
Chen J., et al., "Coding Tools Investigation for Next Generation Video Coding, C 806", ITU-T Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].
Chen J., et al., "Further Improvements to HMKTA-1.0", 52. VCEG meeting, Jun. 19, 2015-Jun. 26, 2015, Warsaw, (Video Coding Experts Group of ITU-T SG.16), No. VCEG-AZ07, Jun. 19, 2015 (Jun. 19, 2015), XP030003885, the whole document.
Chen X., et al., "EE3: Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-E0052, pp. 1-4.
Choi K., et al., "Information on Coding Efficiency Improvements over HEVC for 4K Content", Samsung Electronics, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37043, Geneva, Switzerland, Oct. 2015, 10 Pages.
Galpin F., et al., "EE7 Adaptive Clipping in JEM3.0," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0033-r2, pp. 1-10.
Huawei Technology Ltd. Co., "Reference Sample Adaptive Filtering for Intra Coding", ITU, Telecommunication Standardization Sector, COM 16-C 983-E, Oct. 2015, 4 Pages.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, High efficiency video coding, The International Telecommunication Union, Apr. 2015, 634 pp.
Karczewicz M., et al., "Improvements on Adaptive Loop Filter," Joint Video Exploration Team (JVET) of ITU-T SG 16 WP 3 and ISO/IEC JTC 1/SC 29/WG 11,Document:JVET-B0060-v2, 2nd Meeting: San Diego, USA, Feb. 20-26, 2016, XP030150068, URL: http://PHENIX.INT-EVRY.FR/JVET/.
Karczewicz M., et al., "EE2.5: Improvements on Adaptive Loop Filter," Joint Video Exploration Team (JVET) of ITU-T SG 16 WP

(56) References Cited

OTHER PUBLICATIONS 3 and ISO/IEC JTC 1/SC 29/WG 11, Document: JVET-O0038, 3rd Meeting: Geneva, CH, May 26-Jun. 1, 2016, 4 pages.

Karczewicz M., et al., "Study of Coding Efficiency Improvements beyond HEVC," 113. MPEG Meeting; Oct. 19, 2015-Oct.23, 2015; Geneva; (Motion Picture Expert Group or ISO/IEC JTC1/SC29/WG11),, No. M37102, Oct. 15, 2015 (Oct. 15, 2015), XP030065470, whole document.

Lan C., et al., "VCEG-AZ08-Enhancement of HEVC using Signal Dependent Transform (SDT)", 52nd Meeting, Jun. 19 through 26, 2015, Warsaw, Poland; ITU-Telecommunications Standarization Sector Study Group 16 Question 6 Video Coding Experts Group (VCEG),VCEG-AZ08_V2, Jun. 25, 2015,7 pp.

Lin S., et al., "Affine Transform Prediction for Next Generation Video Coding", Huawei Technologies, International Organisation for Standardisation Organisation Internationale De Normalisation ISO/IEC JTC1/SC29/WG11 Coding of Moving Pictures and Audio, ISO/IEC JTC1/SC29/WG11 MPEG2015/m37525, Geneva, Switzerland, Oct. 2015, 10 Pages.

Liu H., et al., "Local Illumination Compensation", 52, VCEG Meeting, Jun. 19, 2015-Jun. 26, 2015, Warsaw, (Video Coding Experts Group of ITU-T SG.16), No. VCEG-AZ06, Jun. 18, 2015 (Jun. 18, 2015), 11 Pages, XP030003883.

Maani E., et al., "Parametric Adaptive Loop Filter", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11and ITU-T SG.16); URL: http://wftp3.itu.int/av-arch/jctvc-site/,,No. JCTVC-E320, Mar. 10, 2011 (Mar. 10, 2011), XP030008826.

Qualcomm: "Mode-Dependent Non-Separable Secondary Transform", ITU-T SG16 Meeting, Oct. 12, 2015-Oct. 23, 2015, Geneva, No. T13-SG16-C-1 044, Sep. 30, 2015 (Sep. 30, 2015), XP030100752.

Rosewarne C., et al., "High Efficiency Video Coding (HEVC) Test Model16 (HM 16) Improved Encoder Description Update 4", 22nd Meeting, Oct. 15 through 21, 2015, Joint Collaborative Team on Video Coding (JCT-VC) of ITUSG16 and ISO/IEC JTC1/SC29/WG11, JCTVC-V1002, Oct. 2015, 62 pp.

Said A., et al., "Position Dependent Intra Prediction Combination", Qualcomm Incorporated, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37502, Geneva, CH, Oct. 2015, 4 Pages.

Strom J., et al., "EE2-JVET related: Division-free bilateral filter," Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, JVET-F0096, pp. 1-7.

Suehring K., et al., "JVET common test conditions and software reference configurations", 2nd Meeting, Feb. 20 through 26, 20016, San Diego, USA; Joint Collaborative Video Exploration Team (JVET) of ITU-T-SG 16 WP 3 and ISO/IEC JTC 1/SC 29/WG 11, JVET-B1010, Apr. 4, 2016, 4 pp.

Sullivan G.J., et al., "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI:10.1109/TCSVT.2012.2221191.

Wiegand, T., et al., "WD3: Working Draft 3 of High-Efficiency Video Coding," Document JCTVC-E603, 5th Meeting: Geneva, CH, Mar. 16-23, 2011, 160 pages.

Alshina, et al., "Description of Exploration Experiments on Coding Tools," Document JVET-D1011, 4th Meeting: Chengdu, CN, Oct. 15-21, 2016, 13 pages.

"Golomb coding," accessed from https://en.wikipedia.org/wiki/Golomb_coding, accessed on May 9, 2016, 8 pp.

Zhang, et al., "ALF temporal prediction with temporal scalability," Joint Video Exploration Team (JVET) of ITU-T SG 16 WP 3 and ISO/IEC JTC 1/SC 29/WG 11, document No. JVET-E0104, 5th Meeting: Geneva, CH, Jan. 12-20, 2017, last updated Jan. 14, 2017, 4 pp.

Karczewicz, et al., "Geometry Transformation-based Adaptive In-Loop Filter," IEEE 2016, Picture Coding Symposium (PCS) 2016, Dec. 4-7, 2016, 5 pp.

Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.

Chen J., et al., Algorithm Description of Joint Exploration Test Model 2 Joint Video Exploration Team (JVET) of ITU-T SG 16 WP 3 and ISO/IEC JTC 1/SC 29/WG 11, 2nd Meeting: San Diego, Feb. 20-26, 2016, JVET-B1001-v3, 32 Pages.

\* cited by examiner

| TempIdx= 0 | Filters for POC0 | Filters for POC16 | | | | ← 60A |
| TempIdx= 1 | Filters for POC0 | Filters for POC16 | Filters for POC8 | | | ← 60B |
| TempIdx= 2 | Filters for POC0 | Filters for POC16 | Filters for POC8 | Filters for POC4 | | ← 60C |
| TempIdx= 3 | Filters for POC0 | Filters for POC16 | Filters for POC8 | Filters for POC4 | Filters for POC2 | ← 60D |
| TempIdx= 4 | Filters for POC3 | Filters for POC16 | Filters for POC4 | Filters for POC2 | Filters for POC1 | ← 60E |

FIG. 5

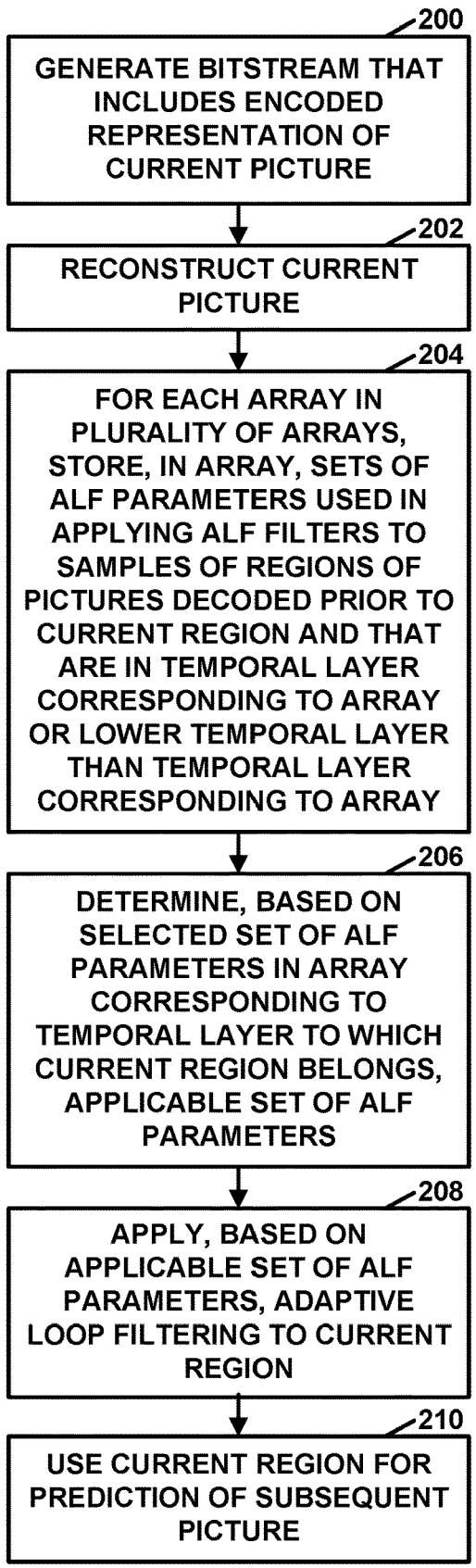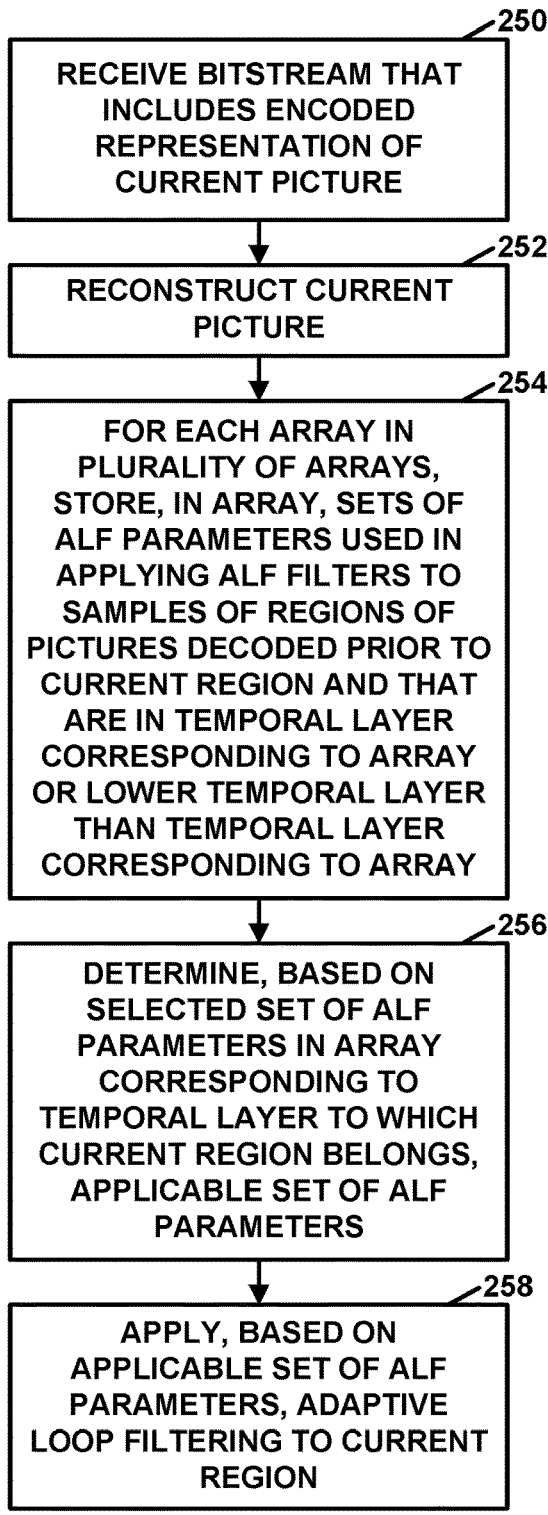
FIG. 9
FIG. 10

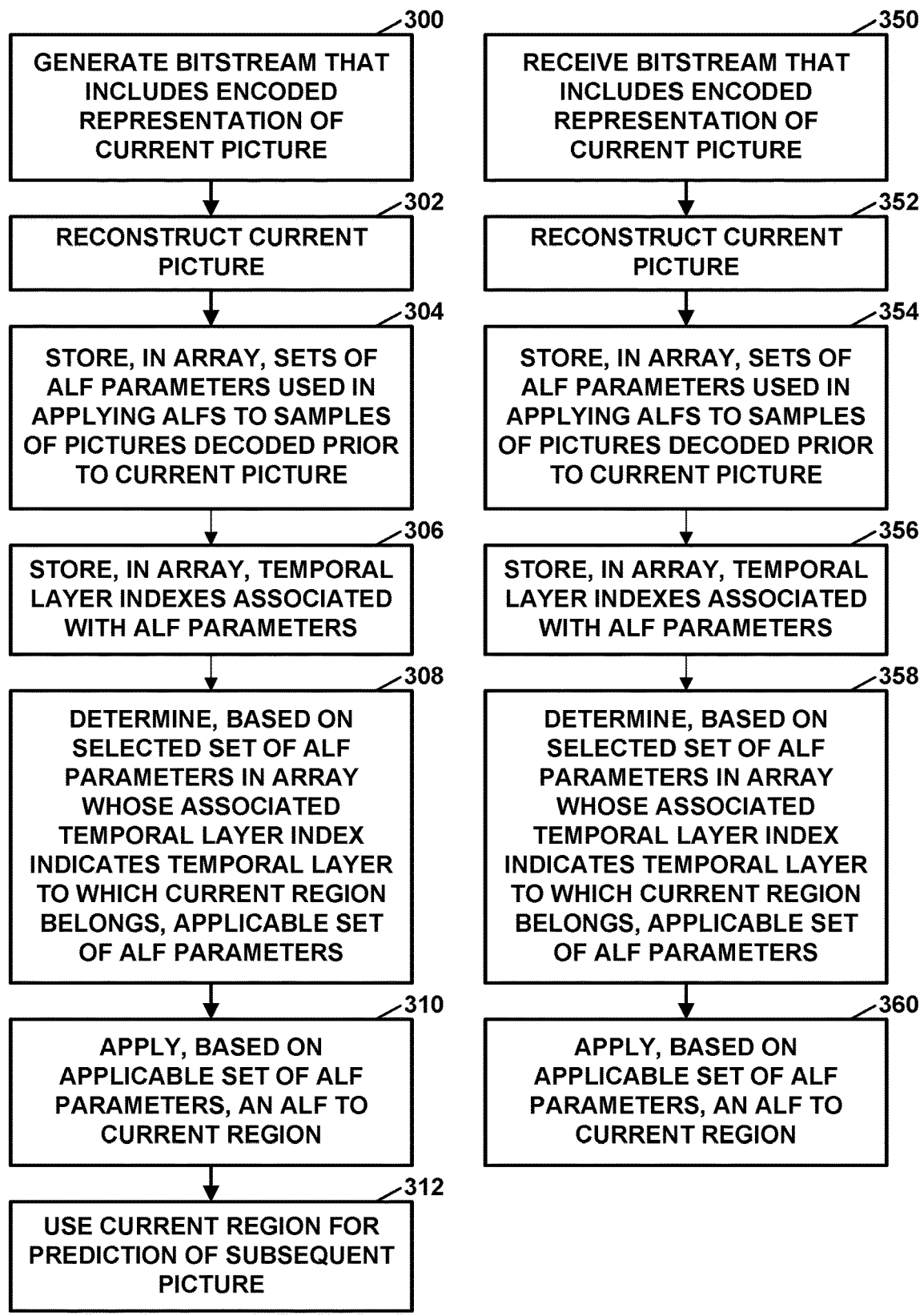

MODIFIED ADAPTIVE LOOP FILTER TEMPORAL PREDICTION FOR TEMPORAL SCALABILITY SUPPORT

This application claims the benefit of U.S. Provisional Application No. 62/442,322, filed Jan. 4, 2017, and U.S. Provisional Application No. 62/445,174, filed Jan. 11, 2017, the entire contents of each of which are incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques may perform spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, such as coding tree blocks and coding blocks. Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized.

SUMMARY

In general, this disclosure describes techniques related to adaptive loop filtering (ALF), especially for prediction of ALF filters from previously coded frames, slices, or tiles. The techniques may be used in the context of advanced video codecs, such as extensions of HEVC or the next generation of video coding standards.

In one example, this disclosure describes a method of decoding video data, the method comprising: receiving a bitstream that includes an encoded representation of a current picture of the video data, wherein a current region of the current picture is associated with a temporal index indicating a temporal layer to which the current region belongs; reconstructing the current picture; for each respective array of a plurality of arrays that correspond to different temporal layers, storing, in the respective array, sets of adaptive loop filtering (ALF) parameters used in applying ALF filters to samples of regions of pictures of the video data that are decoded prior to the current region and that are in the temporal layer corresponding to the respective array or a lower temporal layer than the temporal layer corresponding to the respective array; determining, based on a selected set of ALF parameters in the array corresponding to the temporal layer to which the current region belongs, an applicable set of ALF parameters for the current region; and applying, based on the applicable set of ALF parameters for the current region, adaptive loop filtering to the current region.

In another example, this disclosure describes a method of encoding video data, the method comprising: generating a bitstream that includes an encoded representation of a current picture of the video data, wherein a current region of the current picture is associated with a temporal index indicating a temporal layer to which the current region belongs; reconstructing the current picture; for each respective array of a plurality of arrays that correspond to different temporal layers, storing, in the respective array, sets of adaptive loop filtering (ALF) parameters used in applying ALF filters to samples of regions of pictures of the video data that are decoded prior to the current region and that are in the temporal layer corresponding to the respective array or a lower temporal layer than the temporal layer corresponding to the respective array; determining, based on a selected set of ALF parameters in one of the arrays corresponding to the temporal layer to which the current region belongs, an applicable set of ALF parameters for the current region; applying, based on the applicable set of ALF parameters for the current region, adaptive loop filtering to the current region; and after applying the adaptive loop filtering to the current region, using the current region for prediction of a subsequent picture of the video data.

In another example, this disclosure describes a device for decoding video data, the device comprising: one or more storage media configured to store the video data; and one or more processors configured to: receive a bitstream that includes an encoded representation of a current picture of the video data, wherein a current region of the current picture is associated with a temporal index indicating a temporal layer to which the current region belongs; reconstruct the current picture; for each respective array of a plurality of arrays that correspond to different temporal layers, store, in the respective array, sets of adaptive loop filtering (ALF) parameters used in applying ALF filters to samples of regions of pictures of the video data that are decoded prior to the current region and that are in the temporal layer corresponding to the respective array or a lower temporal layer than the temporal layer corresponding to the respective array; determine, based on a selected set of ALF parameters in the array corresponding to the temporal layer to which the current region belongs, an applicable set of ALF parameters for the current region; and apply, based on the applicable set of ALF parameters for the current region, adaptive loop filtering to the current region.

In another example, this disclosure describes a device for encoding video data, the device comprising: one or more storage media configured to store the video data; and one or more processors configured to: generate a bitstream that includes an encoded representation of a current picture of the video data, wherein a current region of the current picture is associated with a temporal index indicating a temporal layer to which the current region belongs; reconstruct the current picture; for each respective array of a plurality of arrays that correspond to different temporal layers, store, in the respective array, sets of adaptive loop filtering (ALF) parameters used in applying ALF filters to samples of regions of pictures of the video data that are decoded prior to the current region and that are in the temporal layer corresponding to the respective array or a lower temporal layer than the temporal layer corresponding to the respective array; determine, based on a selected set of ALF parameters in one of the arrays corresponding to the temporal layer to which the current region belongs, an applicable set of ALF parameters for the current region; apply, based on the applicable set of ALF parameters for the current region, adaptive loop filtering to the current region; and after applying the adaptive loop filtering to the current region, use the current region for prediction of a subsequent picture of the video data.

In another example, this disclosure describes a device for decoding video data, the device comprising: means for receiving a bitstream that includes an encoded representation of a current picture of the video data, wherein a current region of the current picture is associated with a temporal index indicating a temporal layer to which the current region belongs; means for reconstructing the current picture; for each respective array of a plurality of arrays that correspond to different temporal layers, means for storing, in the respective array, sets of adaptive loop filtering (ALF) parameters used in applying ALF filters to samples of regions of pictures of the video data that are decoded prior to the current region and that are in the temporal layer corresponding to the respective array or a lower temporal layer than the temporal layer corresponding to the respective array; means for determining, based on a selected set of ALF parameters in the array corresponding to the temporal layer to which the current region belongs, an applicable set of ALF parameters for the current region; and means for applying, based on the applicable set of ALF parameters for the current region, adaptive loop filtering to the current region.

In another example, this disclosure describes a device for encoding video data, the device comprising: means for generating a bitstream that includes an encoded representation of a current picture of the video data, wherein a current region of the current picture is associated with a temporal index indicating a temporal layer to which the current region belongs; means for reconstructing the current picture; for each respective array of a plurality of arrays that correspond to different temporal layers, means for storing, in the respective array, sets of adaptive loop filtering (ALF) parameters used in applying ALF filters to samples of regions of pictures of the video data that are decoded prior to the current region and that are in the temporal layer corresponding to the respective array or a lower temporal layer than the temporal layer corresponding to the respective array; means for determining, based on a selected set of ALF parameters in one of the arrays corresponding to the temporal layer to which the current region belongs, an applicable set of ALF parameters for the current region; means for applying, based on the applicable set of ALF parameters for the current region, adaptive loop filtering to the current region; and means for using, after applying the adaptive loop filtering to the current region, the current region for prediction of a subsequent picture of the video data.

In another example, this disclosure describes a computer-readable data storage medium storing instructions that, when executed, cause one or more processors to: receive a bitstream that includes an encoded representation of a current picture of video data, wherein a current region of the current picture is associated with a temporal index indicating a temporal layer to which the current region belongs; reconstruct the current picture; for each respective array of a plurality of arrays that correspond to different temporal layers, store, in the respective array, sets of adaptive loop filtering (ALF) parameters used in applying ALF filters to samples of regions of pictures of the video data that are decoded prior to the current region and that are in the temporal layer corresponding to the respective array or a lower temporal layer than the temporal layer corresponding to the respective array; determine, based on a selected set of ALF parameters in the array corresponding to the temporal layer to which the current region belongs, an applicable set of ALF parameters for the current region; and apply, based on the applicable set of ALF parameters for the current region, adaptive loop filtering to the current region.

In another example, this disclosure describes a computer-readable storage medium storing instructions that, when executed, cause one or more processors to: generate a bitstream that includes an encoded representation of a current picture of the video data, wherein a current region of the current picture is associated with a temporal index indicating a temporal layer to which the current region belongs; reconstruct the current picture; for each respective array of a plurality of arrays that correspond to different temporal layers, store, in the respective array, sets of adaptive loop filtering (ALF) parameters used in applying ALF filters to samples of regions of pictures of the video data that are decoded prior to the current region and that are in the temporal layer corresponding to the respective array or a lower temporal layer than the temporal layer corresponding to the respective array; determine, based on a selected set of ALF parameters in one of the arrays corresponding to the temporal layer to which the current region belongs, an applicable set of ALF parameters for the current region; apply, based on the applicable set of ALF parameters for the current region, adaptive loop filtering to the current region; and after applying the adaptive loop filtering to the current region, use the current region for prediction of a subsequent picture of the video data.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 5 illustrates a plurality of arrays corresponding to different temporal layers, in accordance with a first technique of this disclosure.

FIG. 9 is a flowchart illustrating an example operation of a video encoder, in accordance with a first technique of this disclosure.

FIG. 10 is a flowchart illustrating an example operation of a video decoder, in accordance with the first technique of this disclosure.

FIG. 11 is a flowchart illustrating an example operation of a video encoder, in accordance with a second technique of this disclosure.

FIG. 12 is a flowchart illustrating an example operation of a video decoder, in accordance with the second technique of this disclosure.

DETAILED DESCRIPTION

Figure 1:
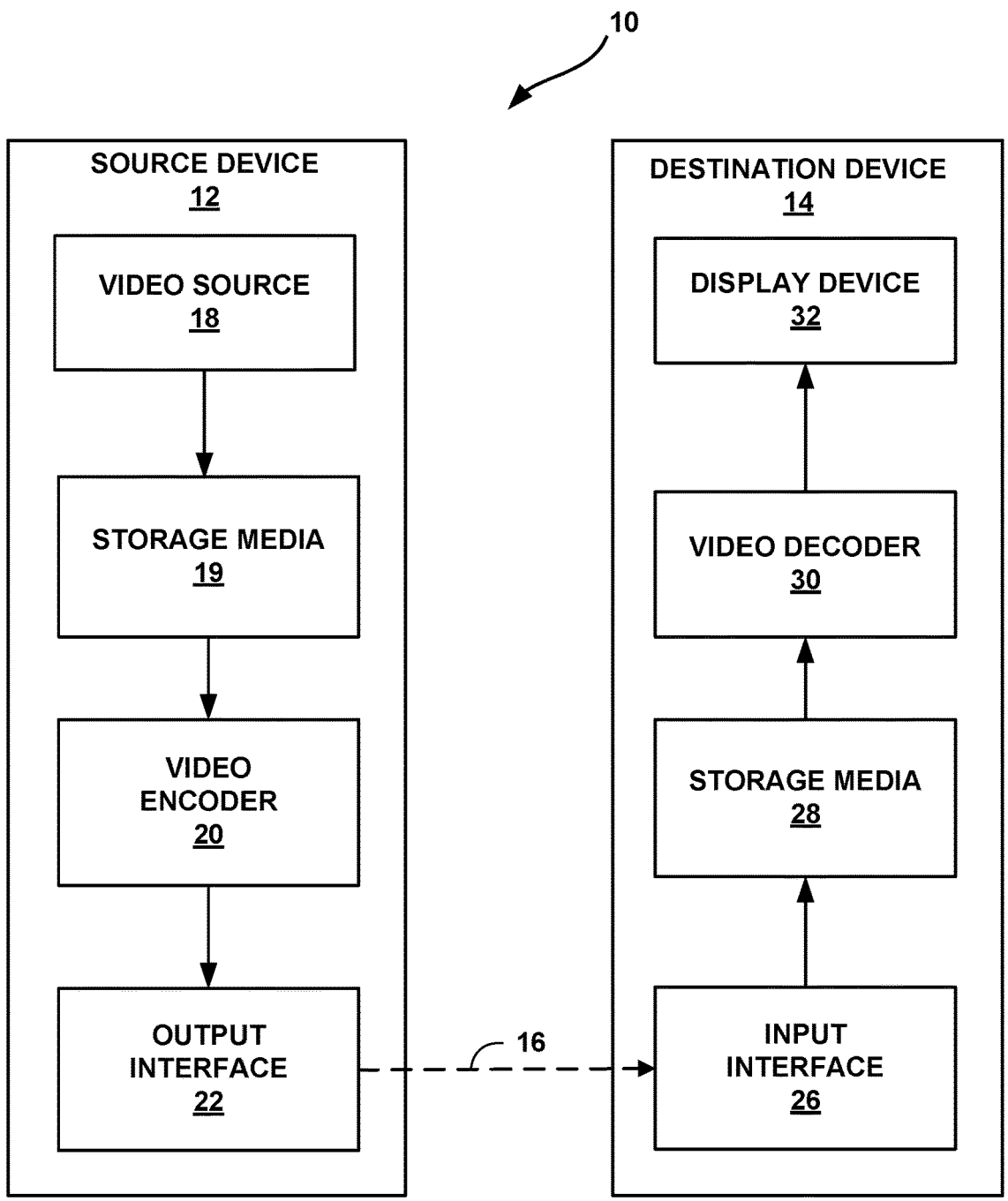
FIG. 1 is a block diagram illustrating an example video encoding and decoding system that may use one or more techniques described in this disclosure.

Adaptive Loop Filtering (ALF) is a process that applies one or more adaptive filters (i.e., an ALF filters) as part of a coding loop to enhance the quality of decoded video data. An ALF filter is associated with a set of coefficients. A video coder (i.e., a video encoder or a video decoder) may apply ALF filters with different coefficients to different blocks of the same picture, based on characteristics of the blocks. To reduce the overhead associated with signaling the coefficients associated with the ALF filters, a video coder may store, in an array, sets of ALF parameters for ALF filters used in previously-coded pictures, tiles, or slices. A set of ALF parameters may include multiple coefficients associated with one or more ALF filters. For instance, a set of ALF parameter may indicate coefficients associated with multiple filters. The video coder replaces sets of ALF parameters in the array according to a First-In First-Out (FIFO) basis.

Different pictures in a video sequence may belong to different temporal layers. Different temporal layers are associated with different temporal identifiers. A picture in a given temporal layer may be decoded with reference to other pictures having the temporal identifier of the given temporal layer and pictures having temporal identifiers with values less than values of the temporal identifier of the given temporal layer.

Because a video coder stores filter data (e.g., sets of ALF parameters) in the array according to a FIFO basis, the array may contain filter data from a picture having a temporal identifier higher than a temporal identifier of a picture currently being decoded. This could potentially cause errors in the filtering process because this may make the current picture dependent on a picture in a temporal layer with a higher temporal identifier than the temporal layer of the current picture if the picture with the higher temporal identifier is lost or is not needed to be decoded.

This disclosure describes techniques that may address this shortcoming. In one example, a video coder may store, in a plurality of arrays, sets of ALF parameters used in applying one or more ALF filters to samples of regions of pictures of the video data coded prior to the current picture. Each respective array of the plurality of arrays corresponds to a respective different temporal layer. Furthermore, the video coder may determine, based on a selected set of ALF parameters in the array corresponding to a temporal layer to which a current region belongs, an applicable set of ALF parameters for the current region. This disclosure may use the term "region" to refer to a slice or other type of area of a current picture for performing ALF. The video coder may apply, based on the applicable set of ALF parameters for the current region, an ALF filter to the current region.

In some examples, a video coder stores, in an array, sets of ALF parameters used in applying one or more ALF filters to samples of pictures of the video data decoded prior to the current picture. Additionally, in this example, the video coder stores, in the array, temporal layer indexes associated with the sets of ALF parameters. A temporal layer index associated with a set of ALF parameters indicates a temporal layer of a region in which the set of ALF parameters was used to apply an ALF filter. In this example, the video coder may determine, based on a selected set of ALF parameters in the array whose associated temporal layer index indicates the temporal layer to which the current region belongs, an applicable set of ALF parameters for the current region. Furthermore, in this example, the video coder may apply, based on the applicable set of ALF parameters for the current region, adaptive loop filtering to the current region.

In either of these examples, associating ALF parameters with temporal layers may help to avoid the problem of a current picture being potentially dependent on the decoding of a picture in a higher temporal layer.

FIG. 1 is a block diagram illustrating an example video encoding and decoding system 10 that may use techniques of this disclosure. As shown in FIG. 1, system 10 includes a source device 12 that provides encoded video data to be decoded at a later time by a destination device 14. In particular, source device 12 provides the encoded video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming devices, or the like. In some cases, source device 12 and destination device 14 are equipped for wireless communication. Thus, source device 12 and destination device 14 may be wireless communication devices. The techniques described in this disclosure may be applied to wireless and/or wired applications. Source device 12 is an example video encoding device (i.e., a device for encoding video data). Destination device 14 is an example video decoding device (i.e., a device for decoding video data).

The illustrated system 10 of FIG. 1 is merely one example. Techniques for processing video data may be performed by any digital video encoding and/or decoding device. In some examples, the techniques may be performed by a video coder, typically referred to as a "CODEC." Source device 12 and destination device 14 are examples of such coding devices in which source device 12 generates coded video data for transmission to destination device 14. In some examples, source device 12 and destination device 14 operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

In the example of FIG. 1, source device 12 includes a video source 18, storage media 19 configured to store video data, a video encoder 20, and an output interface 22. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

Video source 18 is a source of video data. The video data may comprise a series of pictures. Video source 18 may include a video capture device, such as a video camera, a video archive containing previously captured video, and/or a video feed interface to receive video data from a video content provider. In some examples, video source 18 generates computer graphics-based video data, or a combination of live video, archived video, and computer-generated video. Storage media 19 may be configured to store the video data. In each case, the captured, pre-captured, or computer-generated video may be encoded by video encoder 20.

Output interface 22 may output the encoded video information to a computer-readable medium 16. Output interface 22 may comprise various types of components or devices. For example, output interface 22 may comprise a wireless transmitter, a modem, a wired networking component (e.g., an Ethernet card), or another physical component. In examples where output interface 22 comprises a wireless transmitter, output interface 22 may be configured to transmit data, such as encoded video data, modulated according to a cellular communication standard, such as 4G, 4G-LTE, LTE Advanced, 5G, and the like. In some examples where output interface 22 comprises a wireless transmitter, output interface 22 may be configured to transmit data, such as encoded video data, modulated according to other wireless standards, such as an IEEE 802.11 specification, an IEEE 802.15 specification (e.g., ZigBee™), a Bluetooth™ standard, and the like. Thus, in some examples, source device 12 comprises a wireless communication device that includes a transmitter configured to transmit encoded video data. In some such examples, the wireless communication device comprises a telephone handset and the transmitter is configured to modulate, according to a wireless communication standard, a signal comprising the encoded video data.

In some examples, circuitry of output interface 22 is integrated into circuitry of video encoder 20 and/or other components of source device 12. For example, video encoder 20 and output interface 22 may be parts of a system on a chip (SoC). The SoC may also include other components, such as a general purpose microprocessor, a graphics processing unit, and so on.

Destination device 14 may receive encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, output interface 22 may output data, such as encoded video data, to an intermediate device, such as a storage device. Similarly, input interface 26 of destination device 14 may receive encoded data from the intermediate device. The intermediate device may include any of a variety of distributed or locally-accessed data storage media such as a hard drive, Blu-ray discs, DVDs, CD-ROMs, flash memory, volatile or non-volatile memory, or any other suitable digital storage media for storing encoded video data. In some examples, the intermediate device corresponds to a file server. Example file servers include web servers, FTP servers, network attached storage (NAS) devices, or local disk drives.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives data from computer-readable medium 16. Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. Thus, in some examples, destination device 14 may comprise a wireless communication device that comprises a receiver configured to receive encoded video data. In some such examples, the wireless communication device comprises a telephone handset and the receiver is configured to demodulate, according to a wireless communication standard, a signal comprising the encoded video data. In some examples, source device 12 may comprise a transmitter and destination device devices 14 may comprise a transmitter and receiver.

In some examples, circuitry of input interface 26 may be integrated into circuitry of video decoder 30 and/or other components of destination device 14. For example, video decoder 30 and input interface 26 may be parts of a SoC. The SoC may also include other components, such as a general-purpose microprocessor, a graphics processing unit, and so on.

Storage media 28 may be configured to store encoded video data, such as encoded video data (e.g., a bitstream) received by input interface 26. Display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable fixed-function and/or programmable circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 encode and decode video data according to a video coding standard or specification. For example, video encoder 20 and video decoder 30 may encode and decode video data according to ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions, or another video coding standard or specification. In some examples, video encoder 20 and video decoder 30 encode and decode video data according to High Efficiency Video Coding (HEVC), which as known as or ITU-T H.265, its range and screen content coding extensions, its 3D video coding extension (3D-HEVC), its multiview extension (MV-HEVC), or its scalable extension (SHVC). In some examples, video encoder 20 and video decoder 30 operate in accordance with other standards, including standards currently under development.

In HEVC and other video coding specifications, video data includes a series of pictures. Pictures may also be referred to as "frames." A picture may include one or more sample arrays. Each respective sample array of a picture may comprise an array of samples for a respective color component. A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. In some examples, to encode a block of the picture, video encoder 20 performs intra prediction or inter prediction to generate one or more predictive blocks. Additionally, video encoder 20 may generate residual data for the block. The residual block comprises residual samples. Each residual sample may indicate a difference between a sample of one of the generated predictive blocks and a corresponding sample of the block. Video encoder 20 may apply a transform to blocks of residual samples to generate transform coefficients. Furthermore, video encoder 20 may quantize the transform coefficients. In some examples, video encoder 20 may generate one or more syntax elements to represent a transform coefficient. Video encoder 20 may entropy encode one or more of the syntax elements representing the transform coefficient.

More specifically, when encoding video data according to HEVC or other video coding specifications, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a PU of a CU.

Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a PU of a current picture, video encoder 20 may generate the predictive block of the PU based on decoded samples of a reference picture (i.e., a picture other than the current picture). In HEVC, video encoder 20 generates a "prediction unit" syntax structure within a "coding_unit" syntax structure for inter predicted PUs, but does not generate a "prediction unit" syntax structure within a "coding_unit" syntax structure for intra predicted PUs. Rather, in HEVC, syntax elements related to intra predicted PUs are included directly in the "coding_unit" syntax structure.

Video encoder 20 may generate one or more residual blocks for a CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 20 may quantize transform coefficients of the coefficient block. In some examples, video encoder 20 skips quantization.

Video encoder 20 may generate syntax elements indicating some or all the potentially quantized transform coefficients. Video encoder 20 may entropy encode one or more of the syntax elements indicating a quantized transform coefficient. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. The encoded representation of the video data may include an encoded representation of pictures of the video data. For example, the bitstream may comprise a sequence of bits that forms a representation of encoded pictures of the video data and associated data. In some examples, a representation of an encoded picture may include encoded representations of blocks of the picture.

A bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RB SP. The NAL unit header may include a syntax element indicating a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures.

For instance, as part of decoding a picture of the video data, video decoder 30 may use inter prediction or intra prediction to generate predictive blocks. Additionally, video decoder 30 may determine transform coefficients based on syntax elements obtained from the bitstream. In some examples, video decoder 30 inverse quantizes the determined transform coefficients. Furthermore, video decoder 30 may apply an inverse transform on the determined transform coefficients to determine values of residual samples. Video decoder 30 may reconstruct a block of the picture based on the residual samples and corresponding samples of the generated predictive blocks. For instance, video decoder 30 may add residual samples to corresponding samples of the generated predictive blocks to determine reconstructed samples of the block.

More specifically, in HEVC and other video coding specifications, video decoder 30 may use inter prediction or intra prediction to generate one or more predictive blocks for each PU of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct a coding block of the current CU based on samples of the predictive blocks of the PUs of the current CU and residual samples of the transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

As mentioned above, a video coder (e.g., video encoder 20 or video decoder 30) may apply inter prediction to generate a predictive block for a video block of a current picture. For instance, the video coder may apply inter prediction to generate a prediction block of a CU. If the video coder applies inter prediction to generate a prediction block, the video coder generates the prediction block based on decoded samples of one or more reference pictures. Typically, the reference pictures are pictures other than the current picture. In some video coding specifications, a video coder may also treat the current picture itself as a reference picture.

When a video coder (e.g., video encoder 20 or video decoder 30) begins processing a current picture, the video coder may determine one or more reference picture set (RPS) subsets for the current picture. For instance, in HEVC, a video coder may determine the following RPS subsets: RefPicSetStCurrBefore, RefPicSetStCurrAfter, RefPicSetFoll, RefPicSetLtCurr, and RefPicSetLtFoll. Furthermore, the video coder may determine one or more reference picture lists. Each of the reference picture lists of a current picture includes zero or more reference pictures from the RPS of the current picture. One of the reference picture lists may be referred to as Reference Picture List 0 (RefPicList0) and another reference picture list may be referred to as Reference Picture list 1 (RefPicList1).

A slice of a picture may include an integer number of blocks of the picture. For example, in HEVC and other video coding specifications, a slice of a picture may include an integer number of CTUs of the picture. The CTUs of a slice may be ordered consecutively in a scan order, such as a raster scan order. In HEVC and other video coding standards, a slice is defined as an integer number of CTUs contained in one independent slice segment and all subsequent dependent slice segments (if any) that precede the next independent slice segment (if any) within the same access unit. Furthermore, in HEVC and other video coding standards, a slice segment is defined as an integer number of CTUs ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture.

As noted above, a bitstream may include a representation of encoded pictures of the video data and associated data. The associated data may include parameter sets. NAL units may encapsulate RBSPs for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice segment may include a syntax element that indicates a PPS that is active when the slice segment is being coded.

As discussed above, a video encoder may generate a bitstream that comprises a series of NAL units. In multi-layer video coding, different NAL units of the bitstream may be associated with different layers of the bitstream. A layer may be defined as a set of VCL NAL units and associated non-VCL NAL units that have the same layer identifier. A layer may be equivalent to a view in multi-view video coding. In multi-view video coding, a layer can contain all view components of the same layer with different time instances. Each view component may be a coded picture of the video scene belonging to a specific view at a specific time instance. In multi-layer video coding, the term "access unit" may refer to a set of pictures that correspond to the same time instance. Thus, a "view component" may be a coded representation of a view in a single access unit. In some examples, a view component may comprise a texture view component (i.e., a texture picture) or a depth view component (i.e., a depth picture).

In some examples of multi-view video coding, a layer may contain either all coded depth pictures of a specific view or coded texture pictures of a specific view. In other examples of multi-view video coding, a layer may contain both texture view components and depth view components of a specific view. Similarly, in the context of scalable video coding, a layer typically corresponds to coded pictures having video characteristics different from coded pictures in other layers. Such video characteristics typically include spatial resolution and quality level (e.g., Signal-to-Noise Ratio).

For each respective layer of the bitstream, data in a lower layer may be decoded without reference to data in any higher layer. In scalable video coding, for example, data in a base layer may be decoded without reference to data in an enhancement layer. In general, NAL units may only encapsulate data of a single layer. Thus, NAL units encapsulating data of the highest remaining layer of the bitstream may be removed from the bitstream without affecting the decodability of data in the remaining layers of the bitstream. In multi-view coding, higher layers may include additional view components. In SHVC, higher layers may include signal to noise ratio (SNR) enhancement data, spatial enhancement data, and/or temporal enhancement data. In MV-HEVC and SHVC, a layer may be referred to as a "base layer" if a video decoder can decode pictures in the layer without reference to data of any other layer. The base layer may conform to the HEVC base specification (e.g., Rec. ITU-T H.2651 ISO/IEC 23008-2).

In scalable video coding, layers other than the base layer may be referred to as "enhancement layers" and may provide information that enhances the visual quality of video data decoded from the bitstream. Scalable video coding can enhance spatial resolution, signal-to-noise ratio (i.e., quality) or temporal rate.

Multi-view coding may support inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

For instance, NAL units may include headers (i.e., NAL unit headers) and payloads (e.g., RBSPs). The NAL unit headers may include layer identifier syntax elements (e.g., nuh_layer_id syntax elements in HEVC). NAL units that have layer identifier syntax elements that specify different values belong to different "layers" of a bitstream. Thus, in multi-layer view coding (e.g., MV-HEVC, SVC, or SHVC), the layer identifier syntax element of the NAL unit specifies a layer identifier (i.e., a layer ID) of the NAL unit. The layer identifier of a NAL unit is equal to 0 if the NAL unit relates to a base layer in multi-layer coding. Data in a base layer of a bitstream may be decoded without reference to data in any other layer of the bitstream. If the NAL unit does not relate to a base layer in multi-layer coding, the layer identifier of the NAL unit may have a non-zero value. In multi-view coding, different layers of a bitstream may correspond to different views. In scalable video coding (e.g., SVC or SHVC), layers other than the base layer may be referred to as "enhancement layers" and may provide information that enhances the visual quality of video data decoded from the bitstream.

Furthermore, some pictures within a layer may be decoded without reference to other pictures within the same layer. Thus, NAL units encapsulating data of certain pictures of a layer may be removed from the bitstream without affecting the decodability of other pictures in the layer. Removing NAL units encapsulating data of such pictures may reduce the frame rate of the bitstream. A subset of pictures within a layer that may be decoded without reference to other pictures within the layer may be referred to herein as a "sub-layer," "temporal layer," or a "temporal sub-layer." A highest temporal layer may include all pictures in the layer. Thus, temporal scalability may be achieved within one layer by defining a group of pictures with a particular temporal level as a sub-layer (i.e., temporal layer).

NAL units may include temporal identifier (e.g., temporal_id in HEVC) syntax elements. The temporal identifier syntax element of a NAL unit specifies a temporal identifier of the NAL unit. The temporal identifier of a NAL unit identifies a temporal sub-layer with which the NAL unit is associated. Thus, each temporal sub-layer of a bitstream may be associated with a different temporal identifier. If the temporal identifier of a first NAL unit is less than the temporal identifier of a second NAL unit, the data encapsulated by the first NAL unit may be decoded without reference to the data encapsulated by the second NAL unit.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, 14$^{th}$ Meeting, Vienna, AT, 25 Jul.-2 Aug. 2013, document JCTVC-N1003-v1, is an HEVC draft specification. The HEVC standard has been finalized in January 2013.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. The Joint Exploration Model (JEM) is a test model produced by the JVET. J. Chen et al., "Description of Exploration Experiments on Coding Tools," JVET-D1011, Chengdu, October 2016 is an algorithm description for the fourth version of JEM (i.e., JEM4).

In the field of video coding, it is common to apply filtering in order to enhance the quality of a decoded video signal. The filter can be applied as a post-filter, where filtered frame is not used for prediction of future frames or as an in-loop filter, where filtered frame is used to predict future frames. A filter can be designed, for example, by minimizing the error between the original signal and the decoded filtered signal. Similar to transform coefficients, the coefficients of the filter $h(k,l)$, $k=-K, \ldots, K$, $l=-K, \ldots K$ may be quantized as follows:

$$f(k,l) = \text{round}(\text{normFactor} \cdot h(k,l))$$

and coded and sent to a decoder. The normFactor is usually equal to $2^n$. The larger the value of normFactor, the more precise is the quantization and the quantized filter coefficients $f(k,l)$ provide better performance. On the other hand, larger values of normFactor produce coefficients $f(k,l)$ requiring more bits to transmit.

In video decoder 30, the decoded filter coefficients $f(k,l)$ are applied to the reconstructed image $R(i,j)$ as follows:

$$\tilde{R}(i, j) = \sum_{k=-K}^{K} \sum_{l=-K}^{K} f(k, l) R(i+k, j+l) \Big/ \sum_{k=-k}^{K} \sum_{l=-K}^{K} f(k, l), \quad (1)$$

where i and j are the coordinates of the pixels within the frame. The in-loop adaptive filter was evaluated in HEVC stage, but not included in the final version.

The in-loop adaptive loop filter employed in the JEM was described in J. Chen et al., "Coding tools investigation for next generation video coding", SG16-Geneva-C806, January 2015. The basic idea is the same as the ALF with block-based adaption in T. Wiegand et al., "WD3: Working Draft 3 of High-Efficiency Video Coding," Joint Collaborative Team on Video Coding (JCT-VC) of ITU-T SG16 WP3 and ISO/IEC JTC1/SC29/WG11, JCTVC-E603, 5th Meeting: Geneva, CH, 16-23 Mar. 2011, hereinafter, "JCTVC-E603".

For the luma component, 4×4 blocks in the whole picture are classified based on 1-dimensional Laplacian direction (up to 3 directions) and 2-dimensional Laplacian activity (up to 5 activity values). The calculation of direction $Dir_b$ and unquanitzed activity $Act_b$ is shown in equations (2) through (5), where $\hat{I}_{i,j}$ indicates a reconstructed pixel with relative coordinate (i, j) to the top-left of a 4×4 block. $Act_b$ is further quantized to the range of 0 to 4, inclusively, as described in JCTVC-E603.

$$V_{i,j} = |\hat{I}_{i,j} \times 2 - \hat{I}_{i,j-1} - \hat{I}_{i,j+1}| \quad (2)$$

$$H_{i,j} = |\hat{I}_{i,j} \times 2 - \hat{I}_{i-1,j} - \hat{I}_{i+1,j}| \quad (3)$$

$$Dir_b = \begin{cases} 1, & \text{if } \left( \sum_{i=0}^{3} \sum_{j=0}^{3} H_{i,j} > 2 \times \sum_{i=0}^{3} \sum_{j=0}^{3} V_{i,j} \right) \\ 2, & \text{if } \left( \sum_{i=0}^{3} \sum_{j=0}^{3} V_{i,j} > 2 \times \sum_{i=0}^{3} \sum_{j=0}^{3} H_{i,j} \right) \\ 0, & \text{otherwise} \end{cases} \quad (4)$$

$$Act_b = \sum_{i=0}^{3} \sum_{j=0}^{3} \left( \sum_{m=i-1}^{i+1} \sum_{n=j-1}^{j+1} (V_{m,n} + H_{m,n}) \right) \quad (5)$$

Figure 2:
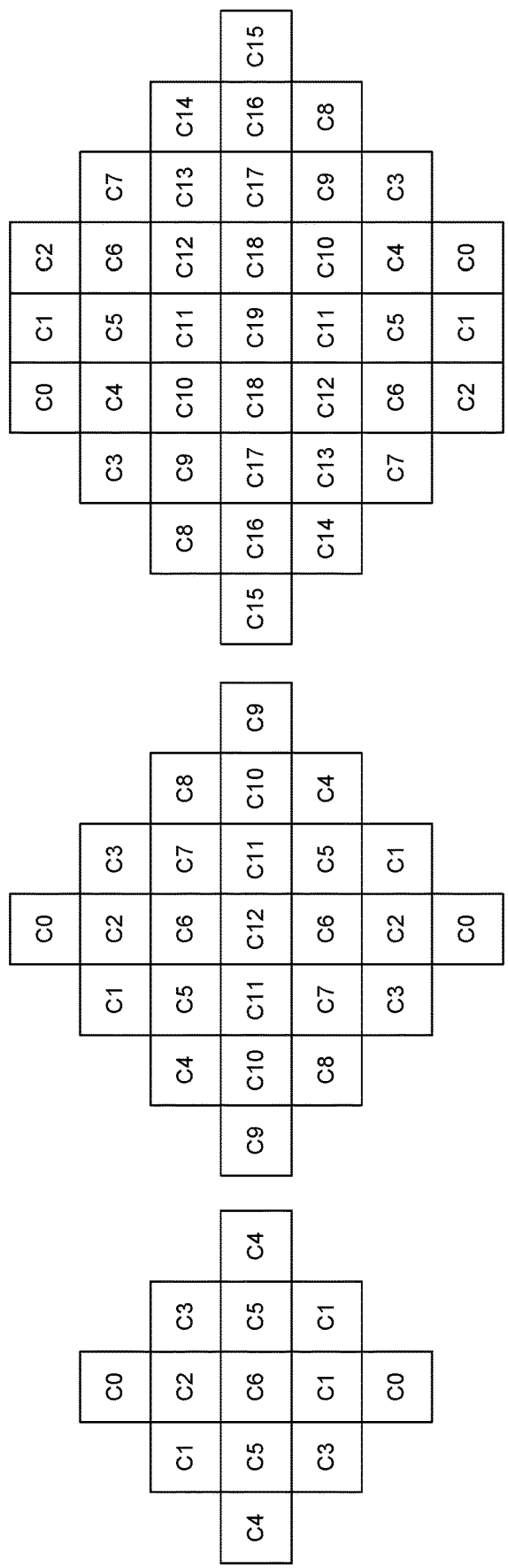
FIG. 2 illustrates three different example Adaptive Loop Filtering (ALF) filter supports.

In total, each block can be categorized into one out of 15 (5×3) groups and an index is assigned to each 4×4 block according the value of $Dir_b$ and $Act_b$ of the block. Denote the group index by C and set C equal to $5Dir_b+\hat{A}$ wherein $\hat{A}$ is the quantized value of $Act_b$. Therefore, video encoder 20 may signal up to 15 sets of ALF parameters for the luma component of a picture. To save the signaling cost, video encoder 20 may merge the groups along group index value. For each merged group, video encoder 20 may signal a set of ALF coefficients. FIG. 2 illustrates three different example ALF filter supports. In the example of FIG. 2, up to three circular symmetric filter shapes are supported. For both chroma components in a picture, a single set of ALF coefficients is applied and the 5×5 diamond shape filter is always used.

At the decoder side, video decoder 30 may filter each pixel sample $\hat{I}_{i,j}$, resulting in pixel value $I'_{i,j}$ as shown in equation (6), where L denotes filter length, $f_{m,n}$ represents filter coefficient and o indicates filter offset.

$$I'_{i,j} = \sum_{m=-KL}^{L} \sum_{n=-L}^{L} f_{m,n} \times \hat{I}_{i+m,j+n} + o \quad (6)$$

In some designs, only up to one filter is supported for the two chroma components.

The following is a list of data that may be signaled for filter coefficients.

1. Total number of filters: Total number of filters (or total number of merged groups) is firstly signaled when ALF is enabled for a slice. The signaled total number of filters applies to the luma component. For chroma components, since only one ALF filter may be applied, there is no need to signal the total number of filters.
2. Filter support: An index of the three filter supports is signaled.
3. Filter index: Indicates which ALF filter is used, i.e., class merging information. Classes which have non-consecutive values of C may be merged, i.e., share the same filter. By coding one flag of each class to indicate whether or not the class is merged, the filter index can be derived. In some examples, class merging information may also be signaled to merge from a left or above filter index.
4. forceCoeff0 flag: The forceCoeff0 flag is used to indicate whether at least one of the filters should not be coded. When this flag is equal to 0, all of the filters should be coded. When the forceCoeff0 flag is equal to 1, one flag of each merged group, denoted by CodedVarBin, is further signaled to indicate the filter should be signaled or not. When the filter is not signaled, it means all of the filter coefficients associated with the filter are equal to 0.
5. Prediction method: When multiple groups of filters need to be signaled, one of the two methods may be used:

All the filters are coded directly into the filter information. In this case, for example, the values of filter coefficients may be encoded into the bitstream without using any predictive encoding techniques. In other words, the filters are explicitly signaled.

The filter coefficients of a first filter are directly coded. While for the remaining filters, the filter coefficients are predictively coded into the filter information. In this case, the values of filter coefficients may be defined by residual values or differences relative to the filter coefficients associated with a previously-coded filter. The previously-coded filter is the one that is the most recent filter (i.e., the filter indices of the current filter and its predictor are consecutive).

To indicate the usage of one of the above two prediction methods, video encoder 20 may signal one flag when the number of merged groups is larger than 1 and forceCoeff0 is equal to 0.

A Set of a ALF Parameters May Include One or More of the Syntax Elements Listed Above and May Also Include Filter Coefficients.

A video coder (e.g., video encoder 20 or video decoder 30) may also use temporal prediction of filter coefficients. The video coder may store ALF coefficients of previously-coded pictures and may reuse the ALF coefficients of the previously-coded pictures as ALF coefficients of a current picture. Video encoder 20 may choose to use the stored ALF coefficients for the current picture and bypass signaling of the ALF coefficients. In this case, video encoder 20 only signals an index to one of the reference pictures (which is actually equal to the index of the candidate in the stored array for ALF parameters), and the stored ALF coefficients of the indicated picture are simply inherited for the current picture. To indicate the usage of temporal prediction, video encoder 20 may first encode a flag indicating usage of temporal prediction, before sending the index to the reference picture.

In JEM4, video coders store ALF parameters from at most six previously-coded pictures which are coded with ALF parameters signaled (i.e., temporal prediction is disabled) in a separate array. A video coder effectively empties the array for intra random access point (IRAP) pictures. To avoid duplicates, the video coder only stores ALF parameter values in the array if the ALF parameter values were explicitly signaled. Storing of ALF parameters operates in a FIFO fashion, so if the array is full, the video coder overwrites the oldest ALF parameter values (i.e., ALF parameters) with a new set of ALF parameter values, in decoding order.

In M. Karczewicz et al., "Improvements on adaptive loop filter", Exploration Team (JVET) of ITU-T SG 16 WP 3 and ISO/IEC JTC 1/SC 29/WG 11, Doc. JVET-B0060_r1, 2nd Meeting: San Diego, USA, 20-26 Feb. 2016 (hereinafter, "JVET-B0060"), the Geometric transformations-based ALF (GALF) is proposed. In GALF, the classification is modified with diagonal gradients taken into consideration and geometric transformations may be applied to filter coefficients.

Based on all the gradient information including horizontal, vertical and diagonal gradients, one of four geometry transformations of filter coefficients is determined. That is, samples classified into the same category will share the same filter coefficients. However, the filter support region may be transformed based on the selected geometric transformation index. The method described in JVET-B0060 may effectively reduce the number of filters which have to be sent to the decoder, hence reducing the number of bits required to represent them, or alternatively reduce the differences between reconstructed frames and original frames. Each 2×2 block is categorized into one out of 25 classes based on its directionality and a quantized value of activity.

Furthermore, in JVET-B0060, to improve coding efficiency when temporal prediction is not available (e.g., in intra frames), a video coder assigns a set of 16 fixed filters to each class. That is, 16*25(classes) filters may be pre-defined. To indicate the usage of a fixed filter, a flag for each class is signaled and, if required, the index of the fixed filter. Even when the fixed filter is selected for a given class, the coefficients of the adaptive filter f(k, l) can still be sent for this class, in which case the coefficients of the filter which will be applied to the reconstructed image are sum of both sets of coefficients. One or more of the classes can share the same coefficients f(k, l) signaled in the bitstream, even if different fixed filters were chosen for them. U.S. Patent Publication No. 2017/0238020, published Aug. 17, 2017, describes how the fixed filters could also be applied to inter-coded frames.

In JVET-B0060, the design of temporal prediction from previously-coded frames as in the second version of JEM (i.e., JEM2) is kept unchanged. JEM2 is described in Jianle Chen et al., "Algorithm Description of Joint Exploration Test Model 2," Joint Video Exploration Team (WET) of ITU-T SG 16 WP 3 and ISO/IEC JTC 1/SC 29/WG 11, $2^{nd}$ Meeting, San Diego, USA, 20-26 Feb. 2016, document JVET-B1001_v3. That is, a flag is coded to indicate whether temporal prediction of ALF coefficients is used. If temporal prediction of ALF coefficients is used, an index of the selected pictures for stored ALF parameters is further signaled. In this case, there is no need to signal the filter indices for each class and filter coefficients.

Furthermore, explicit coding of ALF filter coefficients may be used with GALF. For instance, a prediction pattern and prediction index from fixed filters may be explicitly coded in GALF. Three cases are defined:

case 1: whether none of the filters of the 25 classes are predicted from the fixed filters;

case 2: all filters of the classes are predicted from the fixed filters; and case 3: filters associated with some classes are predicted from fixed filters and filters associated with the rest classes are not predicted from the fixed filters.

An index may be firstly coded to indicate one of the three cases. In addition, the following applies:

If the indicated case is case 1, there is no need to further signal the index of the fixed filter.

Otherwise, if the indicated case is case 2, an index of the selected fixed filter for each class is signaled.

Otherwise, if the indicated case is case 3, one bit for each class is firstly signaled, and if a fixed filter is used, the index of the fixed filter is further signaled.

In GALF, to reduce the number of bits required to represent the filter coefficients, different classes can be merged. However, unlike in JCTVC-E603, any set of classes can be merged, even classes having non-consecutive values of C. The information regarding which classes are merged is provided by sending for each of the 25 classes an index $i_C$. Classes having the same index $i_C$ share the same filter coefficients that are coded. The index $i_C$ is coded with truncated a fixed-length method.

Similarly, the forceCoeff0 flag may also be used. When the forceCoeff0 flag is equal to 1, a one-bit flag, denoted by CodedVarBin, is further signaled for each of the merged groups (all filters to be coded) to indicate whether the signaled filter coefficients are all zero. Moreover, when forceCoeff0 is equal to 1, the predictive coding (i.e., coding the difference between the current filter and previously-coded filter) is disabled. When prediction from fixed filters is allowed, the filters to be signaled/coded mentioned above are the differences between the filter applied to the reconstructed image and the selected fixed filter. Other information, such as coefficients are coded in the same way as in JEM2.0.

Because GALF is a form of ALF, this disclosure may use the term "ALF" to apply to both ALF and GALF.

Figure 3:
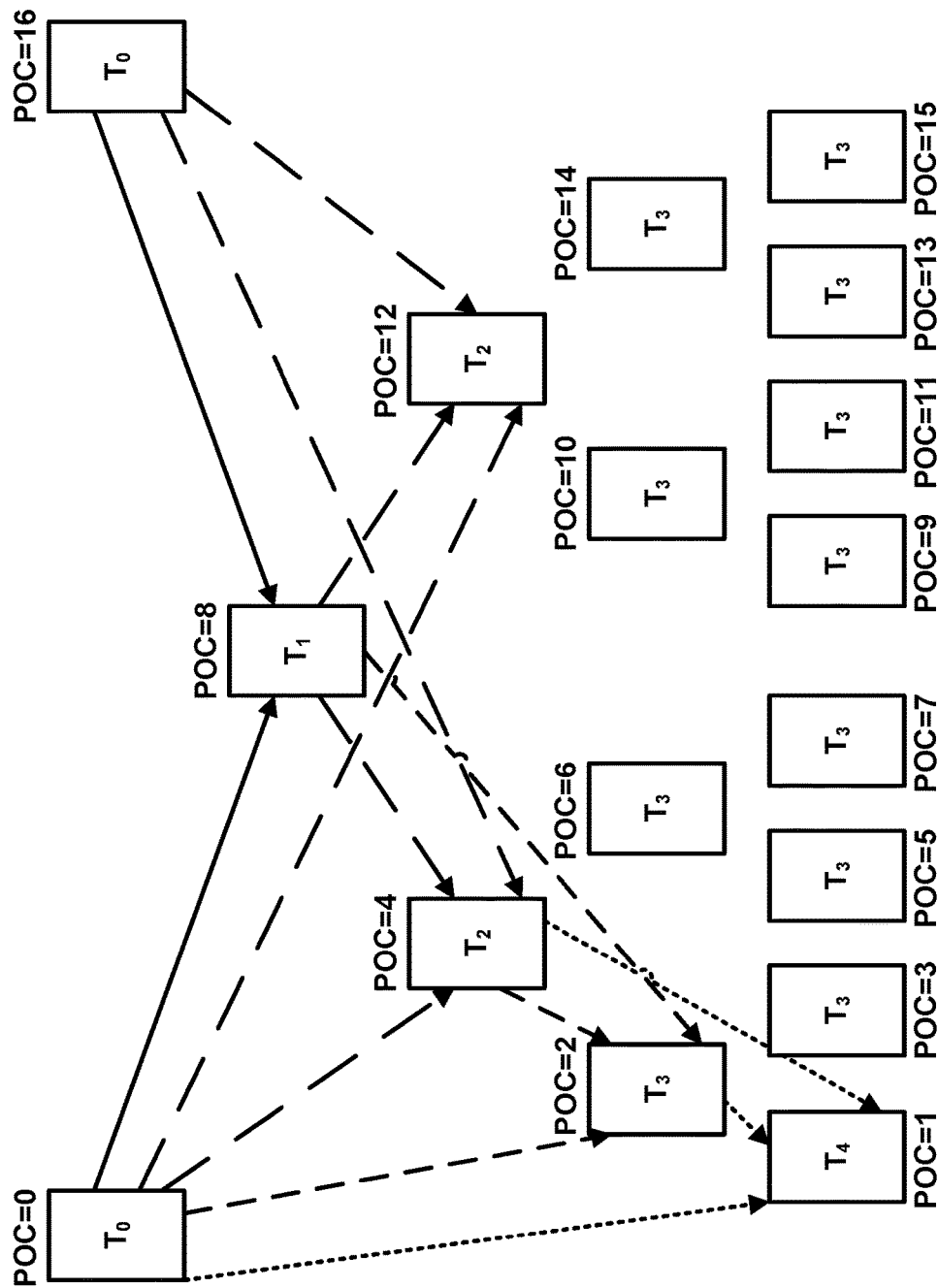
FIG. 3 illustrates an example of Random Access configuration with Group of Pictures (GOP) equal to 16.

The current designs for temporal prediction of filters in ALF and GALF have several shortcomings. For example, if a picture uses explicit coding of filters, after decoding the picture, the corresponding ALF filters may be added to an array of ALF filters for temporal prediction, regardless of temporal layers. That is, after decoding the picture, a video coder may include a set of ALF parameters in an entry in the array. The set of ALF parameters may include filter coefficients and group merging information for each of the ALF filters used in the picture. This design leads to failure when decoding of a subset of temporal layers under certain configurations, such as random access. An example is given in FIG. 3 wherein the GOP size is equal to 16. In the example of FIG. 3, five temporal layers are supported (indicated by $T_0$ to $T_4$). The encoding/decoding order of the pictures is: Picture Order Counter (POC) 0 [$T_0$], POC 16 [$T_0$], POC8 [$T_1$], POC4 [$T_2$], POC2 [$T_3$], POC1 [$T_4$], POC3 [$T_4$], POC6 [$T_3$], POC5 [$T_4$], POC7 [$T_4$], POC12 [$T_2$], POC10 [$T_3$], POC9 [$T_4$], POC11 [$T_4$], POC14 [$T_3$], POC13 [$T_4$], POC15 [$T_4$]. Arrows with different dash patterns point to pictures that may use the pointed from pictures as reference pictures. Note that FIG. 3 omits certain arrows for the sake of clarity.

Figure 4A:
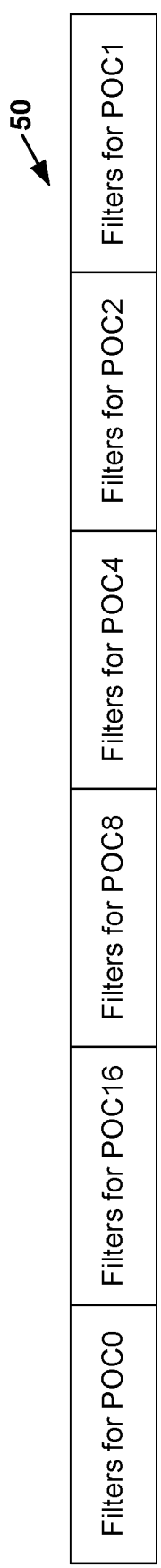
FIG. 4A illustrates an array for storing filter parameters.
Figure 4B:
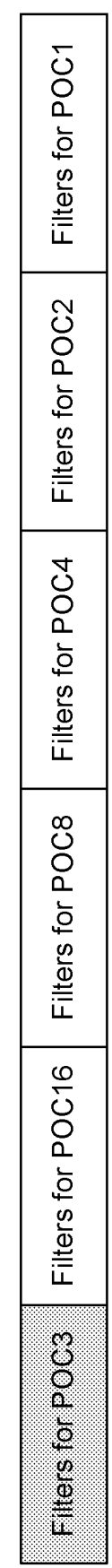
FIG. 4B illustrates a different state of the array for storing filter parameters.

FIG. 4A illustrates an array 50 for storing filter parameters. FIG. 4B illustrates a different state of array 50. Assuming that each picture is coded with ALF enabled and the ALF filters for each picture are explicitly signaled, before decoding POC3 of FIG. 3, the array for stored filters has the state shown in FIG. 4A. After decoding POC3 and before decoding POC6 of FIG. 3, the array for stored ALF filters is updated as shown in FIG. 4B. As shown in the example of FIG. 4B, the filters for POC0 have been replaced with the filters for POC3 because filters are replaced in a FIFO fashion and the filters for POC0 were the first filters added to array 50.

Therefore, for decoding POC6 with temporal layer index (TempIdx) equal to 3, the filters of POC1, POC3 with temporal layer index equal to 4 are required to be decoded. This conflicts with the spirit of temporal scalability, wherein decoding a picture with a certain value of TempIdx should not rely on pictures with a larger value of TempIdx.

A second shortcoming of the current designs for temporal prediction of filters in ALF is that, when temporal prediction of ALF filters is enabled for a slice, in some examples, all the ALF filters from a certain previously-coded frame shall be inherited. That means the merging of classes and filter coefficients are directly reused without the possibility of slightly modifying the classes and filter coefficients to better capture the characteristics for a current slice.

The following techniques are proposed to resolve one or more of the shortcomings of the current designs for temporal prediction of filters in ALF mentioned above. The following itemized techniques may be applied individually. Alternatively, any combination of them may be applied.

In accordance with a first technique, multiple arrays may be allocated to store one or more sets of previously-coded ALF filters. In other words, a video coder may store sets of ALF parameters in a plurality of arrays. Each array corresponds to an assigned temporal layer index (TempIdx, which is equivalent to TemporalId defined in the HEVC specification). In accordance with the first technique, each array only contains ALF parameters from pictures with the same TempIdx or lower TempIdx. A slice (or other unit for performing ALF) with the TempIdx may select one set of filters composed in this array. In other words, a video coder may apply, to samples in a block of the slice, an ALF filter based on ALF parameters in the array corresponding to the TempIdx of the slice. For a region which is coded with ALF enabled, and assuming ALF parameters are explicitly signaled (i.e., no temporal prediction), the set of ALF parameters for this region may be added to the array associated with the same or higher TempIdx. This may resolve the shortcomings described above regarding the array of stored ALF parameters including one or more ALF parameters corresponding to ALF filters used in pictures of temporal layers higher than the temporal layer of the current picture.

FIG. 5 illustrates a plurality of arrays 60A-60E (collectively, "arrays 60") corresponding to different temporal layers, in accordance with a technique of this disclosure. In the example of FIG. 5, assuming that each picture of FIG. 3 is coded with ALF enabled and the ALF filters for each picture are explicitly signaled, before decoding POC6 of FIG. 3, the arrays for stored ALF filters have the states shown in FIG. 5.

In the example of FIG. 5, since POC6 is in temporal layer $T_3$, a video coder may use ALF filters from array 60D. Thus, unlike the example of FIG. 4B, whether or not POC1 is decoded has no impact on which ALF filters are available for use when decoding POC 6.

In this way, in accordance with the first technique, video encoder 20 may generate a bitstream that includes an encoded representation of a current picture of the video data. A current region (e.g., slice or other type of unit for performing ALF) of the current picture is associated with a temporal index (i.e., a temporal layer index) indicating a temporal layer to which the current region belongs. Furthermore, video encoder 20 reconstructs all or part of the current picture. Video encoder 20 stores, in a plurality of arrays, sets of ALF parameters used in applying ALF filters to samples of regions of pictures of the video data decoded prior to the current region. For instance, for each respective array of a plurality of arrays that correspond to different temporal layers, video encoder 20 may store, in the respective array, sets of ALF parameters used in applying ALF filters to samples of regions of pictures of the video data that are decoded prior to the current region and that are in the temporal layer corresponding to the respective array or a lower temporal layer than the temporal layer corresponding to the respective array. Each respective array of the plurality of arrays corresponds to a respective different temporal layer. Furthermore, video encoder 20 determines, based on a selected set of ALF parameters in one of the arrays corresponding to the temporal layer to which the current region belongs or corresponding to a lower temporal layer than the temporal layer to which the current region belongs, an applicable set of ALF parameters for the current region. In some examples, video encoder 20 may determine the selected set of ALF parameters based on a rate-distortion analysis of the sets of ALF parameters in the arrays. Video encoder 20 may signal an index of the selected set of ALF parameters in the bitstream. Furthermore, in this example, video encoder 20 applies, based on the applicable set of ALF parameters for the current region, adaptive loop filtering to the current region. Applying adaptive loop filtering to the current region may comprise applying an ALF filter to one or more, but not necessarily all, blocks within the current region. After applying the adaptive loop filtering to the current region, video encoder 20 may use the current region for prediction of a subsequent picture of the video data.

Similarly, in accordance with the first technique, video decoder 30 may receive a bitstream that includes an encoded representation of a current picture of the video data. A current region of the current picture is associated with a temporal index indicating a temporal layer to which the current region belongs. Video decoder 30 may then reconstruct all or part of the current picture. Additionally, video decoder 30 stores, in a plurality of arrays, sets of ALF parameters used in applying ALF filters to samples of regions of pictures of the video data decoded prior to the current picture. Each respective array of the plurality of arrays corresponds to a respective different temporal layer. For instance, for each respective array of a plurality of arrays that correspond to different temporal layers, video decoder 30 may store, in the respective array, sets of ALF parameters used in applying ALF filters to samples of regions of pictures of the video data that are decoded prior to the current region and that are in the temporal layer corresponding to the respective array or a lower temporal layer than the temporal layer corresponding to the respective array. Video decoder 30 determines, based on a selected set of ALF parameters in the array corresponding to the temporal layer to which the current region belongs or arrays of the plurality of arrays corresponding to a lower temporal layer than the temporal layer to which the current region belongs, an applicable set of ALF parameters for the current region. In some examples, video decoder 30 determines the selected set of ALF parameters based on an index signaled in the bitstream. Video decoder 30 may then apply, based on the applicable set of ALF parameters for the current region, adaptive loop filtering to the current region. Applying the ALF filter to the current region may comprise applying the ALF filter to one or more, but not necessarily all, blocks within the current region.

Each array assigned by TempIdx may comprise sets of previously-decoded filters associated pictures with equal or lower TempIdx. For example, the k-th array is assigned to be associated with TempIdx equal to k, and it will only contain the full sets or the subsets of filters (e.g., ALF parameters for filters) from pictures with TempIdx equal to or lower than k.

Thus, for each respective array of the plurality of arrays, a video coder (e.g., video encoder 20 or video decoder 30) may store in the respective array sets of ALF parameters used in applying ALF filters to samples of regions of the pictures of the video data decoded prior to the current picture that belong to the temporal layer corresponding to the respective array and that belong to temporal layers lower than the temporal layer corresponding to the respective array.

In some examples, the numbers of filter sets associated with different arrays may be different (which could be greater or equal to 0). Alternatively, in some examples, the numbers of the filter sets associated with different temporal layers may be different and may depend on the temporal layer index. Thus, in some examples, at least two of the plurality of arrays include different numbers of sets of ALF parameters. For instance, in the example of FIG. 5, it may be unnecessary to have five locations in array 60A because, in a GOP of 16 pictures, there will never be more than two pictures in temporal layer $T_0$. Thus, array 60A may only have two locations. Similarly, in the example of FIG. 5, in a GOP of 16 pictures, there will be at most one picture in temporal layer $T_1$. Hence, array 60B may only have three locations.

In some examples, after coding a certain slice/unit for performing ALF, a video coder may use the set of filters associated with the slice to update those arrays associated with equal or higher TempIdx. For instance, a video coder may store, in the array corresponding to the temporal layer to which the current region belongs (and, in some instances, arrays corresponding to temporal layers corresponding to higher temporal layers than the temporal layer to which the current region belongs), a set of ALF parameters applicable to a current region (i.e., slice or another unit for performing ALF). For instance, in the example of FIG. 3 and FIG. 5, if the current region is in a picture associated with POC 8, the video coder may update arrays 60B, 60C, 60D, and 60E to include the set of ALF parameters applicable to the current region.

In some examples, the POC value associated with each filter set (e.g., a set of ALF parameters) may be also recorded. Thus, a video coder may store, in the array corresponding to the temporal layer to which a current region of a current picture belongs, a POC value of the current picture. In one example, when selecting a filter as a candidate from a given array for ALF temporal prediction, it may be required that the POC value associated with the filter is equal to a POC value of one of the reference pictures in current reference picture lists. For example, in addition to storing the ALF parameters for ALF filters used by the picture at POC0 in FIG. 5, a video coder may store in array 60A data indicating a value of POC0. In this example, if the picture at POC0 is not in a reference picture of the picture at POC6 when encoding a region of the picture at POC6, video encoder 20 is not allowed to select an ALF filter from among the ALF filters stored in array 60A for the picture at POC0.

In accordance with a second technique, an array is still used to store sets of previously-coded ALF filters. In addition to filters, for each set (which may contain multiple filters used for coding a slice/picture), the temporal layer index (TempIdx) associated with the filter set is also recorded. In other words, temporal layer indexes may be stored along with ALF parameters for ALF filters.

In some examples based on the second technique, the size of the array may be set to (number of possible temporal layers)*(maximum number of sets of filters for temporal prediction for a slice/picture or other unit for ALF usage). In one example, the number of possible temporal layers may depend on a coding structure (e.g., how many levels are supported in the hierarchy B structure) or a low delay check flag (NoBackwardPredFlag in the HEVC specification).

In one example, a maximum number of sets of filters for temporal prediction for a slice/picture or other unit for ALF usage may be pre-defined or signaled or depend on the TempIdx. In one example, the number of possible temporal layers is set to 5 and the maximum number of sets of filters for temporal prediction for a slice/picture or other unit for ALF usage is set to 6. When coding a slice/picture, the possible candidates for temporal prediction may be decided by traversing the sets included in the array and all or some filter sets with equal or smaller TempIdx are treated as effective candidates.

After coding a certain slice/unit for performing ALF, the set of filters associated with the slice and the associated TempIdx may be used to update the array. For example, a video coded (e.g., video encoder 20 or video decoder 30) may determine, based on a selected set of ALF parameters in the array, an applicable set of ALF parameters for a region. In this example, the encoder or decoder may store, in the array, the applicable set of ALF parameters. The encoder or decoder may also store the applicable set of ALF parameters in one or more of the arrays corresponding to higher temporal layers than the temporal layer to which the current region belongs. In this example, the video coder may not store ALF parameters in the array if the ALF parameters were not explicitly signaled in the bitstream. In some examples, the encoder or decoder only stores the applicable set of ALF parameters in the array if the applicable set of ALF parameters has not yet been stored in the array.

Figure 6:
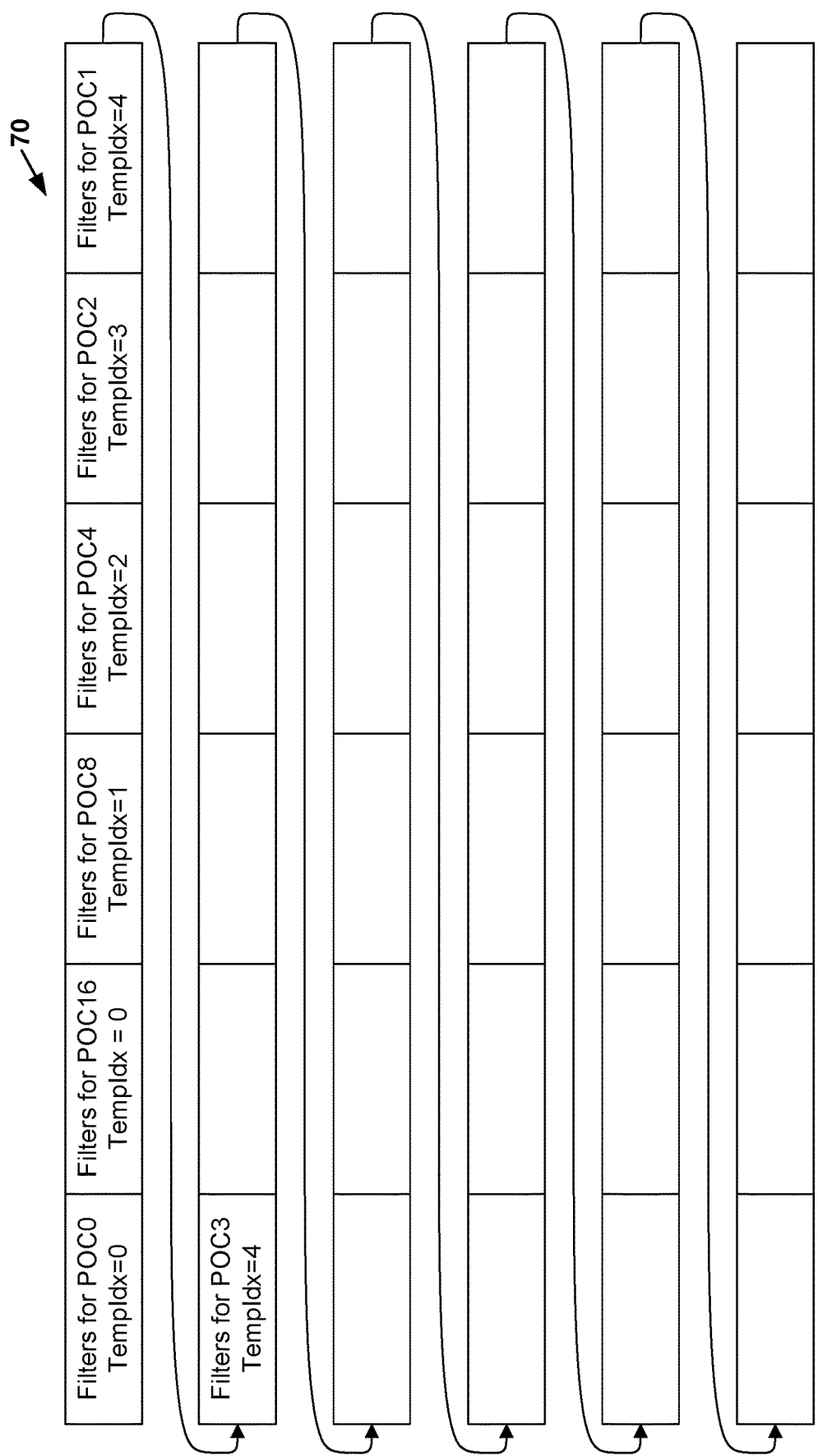
FIG. 6 illustrates an array for storing ALF parameters and associated temporal layer index values, in accordance with a second technique of this disclosure.

FIG. 6 illustrates an array 70 for storing ALF parameters and temporal layer index (TempIdx) values, in accordance with the second technique of this disclosure. In the example of FIG. 6, the number of possible temporal layers is 5 and maximum number of sets of filters for temporal prediction for a region is set to 6, resulting in array 70 containing 30 entries. In the example of FIG. 6, assuming that each picture of FIG. 3 is coded with ALF enabled and the ALF filters for each picture are explicitly signaled, before decoding POC6 of FIG. 3, the arrays for stored ALF filters have the states shown in FIG. 6.

In the example of FIG. 6, a video coder may review the TempIdx values stored in array 70 to determine which of the entries in array 70 store ALF parameters that the video coder may use as predictors of ALF parameters used in coding POC6. In doing so, the video coder may ignore any entries specifying TempIdx values greater than the $T_3$ (i.e., the TempIdx for POC6). In contrast to the example of FIG. 4B, the filters for POC0 are not overwritten by the filters for POC3.

In this way, in accordance with the second technique of this disclosure, video encoder 20 may generate a bitstream that includes an encoded representation of a current picture of the video data. A current region of the current picture is associated with a temporal index indicating a temporal layer to which the current region belongs. Additionally, video encoder 20 may reconstruct the current picture. Video encoder 20 also stores, in an array, sets of ALF parameters used in applying ALF filters to samples of pictures of the video data decoded prior to the current picture. Furthermore, video encoder 20 stores, in the array, temporal layer indexes associated with the sets of ALF parameters. A temporal layer index associated with a set of ALF parameters indicates a temporal layer of a region in which the set of ALF parameters was used to apply an ALF filter. In this example, video encoder 20 determines, based on a selected set of ALF parameters in the array whose associated temporal layer index indicates the temporal layer to which the current region belongs or a temporal layer lower than the temporal layer to which the current region belongs, an applicable set of ALF parameters for the current region. Video encoder 20 may then apply, based on the applicable set of ALF parameters for the current region, adaptive loop filtering to the current region. After applying the adaptive loop filtering to the current region, video encoder 20 may use the current region for prediction of a subsequent picture of the video data.

Similarly, in accordance with the second technique of this disclosure, video decoder 30 may receive a bitstream that includes an encoded representation of a current picture of the video data. A current region of the current picture is associated with a temporal index indicating a temporal layer to which the current region belongs. Furthermore, video decoder 30 may reconstruct the current picture. In this example, video decoder 30 stores, in an array, sets of ALF parameters used in applying ALF filters to samples of pictures of the video data decoded prior to the current picture. Additionally, video decoder 30 stores, in the array, temporal layer indexes associated with the sets of ALF parameters. A temporal layer index associated with a set of ALF parameters indicates a temporal layer of a region in which the set of ALF parameters was used to apply an ALF filter. In this example, video decoder 30 may determine, based on a selected set of ALF parameters in the array whose associated temporal layer index indicates the temporal layer to which the current region belongs, an applicable set of ALF parameters for the current region. Additionally, in this example, video decoder 30 may apply, based on the applicable set of ALF parameters for the current region, adaptive loop filtering to the current region.

In some examples based on the second technique of this disclosure, the POC value associated with each set of ALF filters may be also recorded. For example, a video coder may also store, in an array (e.g., array 70), a POC value of a current picture of which ALF parameters are explicitly coded. Thus, in this example, after encoding/decoding a plurality multiple pictures, the video coder has stored, in the array, sets of ALF parameters used in applying ALF filters to samples of pictures of the video data decoded prior to a new current picture.

In one example, the possible candidates for temporal prediction may be decided by traversing the sets included in the array, all or some filter sets with equal or smaller TempIdx and those with a POC value equal to a POC value of one of the reference picture in a current reference picture list may be treated as effective candidates. For example, a video coder may determine, based on a selected set of ALF parameters in the array whose associated temporal layer index indicates the temporal layer to which a current region of a current picture belongs or a temporal layer lower than the temporal layer to which the current region belongs, an applicable set of ALF parameters for the current region. In this example, it is required that, when determining the applicable set of ALF parameters for the current region, a POC value associated with the applicable set of ALF parameters for the current region is equal to a POC value of a reference picture in a reference picture list of the current picture.

In some examples based on the second technique of this disclosure, each ALF filter to be stored in the array shall be associated with a reference picture that is included in a reference picture set of the current picture (these pictures would also be available in the decoded picture buffer). That is, if a picture is not included in the reference picture set of the current picture, the filters associated with the current picture cannot be stored and used for ALF temporal prediction.

In some examples based on the second technique of this disclosure, the size of the array may depend on the size of a reference picture set. For example, the size of the array may be equal to a maximum number of reference pictures that are allowed to be in a reference picture set.

In some examples, a video coder does not generate a list specifically for ALF filter parameters (i.e., ALF parameters), but the list is the same as the reference picture lists that are generated for the current slice. In this case, the ALF parameters associated with reference pictures of the current region are directly stored together with other information (such as reconstruction samples, motion information of each block with one region) required by reference pictures storage. As another alternative, the list of ALF filter parameters is set equal to the reference picture set of the current slice (or picture).

In another example where each ALF filter stored in the array (e.g., array 70) is associated with a reference picture included in the reference picture set of the current picture, the list (array) of ALF filter parameters (associated with reference pictures included in the reference picture set of the current picture) is separately generated independently of the reference picture lists for the current slice. For efficient generation of an efficient list of ALF filter parameters, such that more frequently used sets of ALF filter parameters are in earlier positions in the list of ALF filter parameters, syntax elements for signaling of a particular order of the candidate sets of ALF filter parameter in the list of ALF filter parameters can be included in a slice header, similarly as the reference picture list modification syntax in the slice header.

In accordance with a third technique, instead of using the FIFO rule to update an array(s) for stored ALF filters, it is proposed to further consider Picture Order Count (POC) differences for updating the array(s). For example, if an array (e.g., array 50 of FIG. 4A and FIG. 4B, one of arrays 60 of FIG. 5, or array 70 of FIG. 6) is full, a video coder may determine which entry in the array stores ALF filters associated with a POC value most different from a POC value of a current picture. In one example based on the first technique, when a set of ALF parameters are explicitly signaled for a region of a current picture, a video coder may determine, based on differences between a POC value of the current picture and POC values associated with sets of ALF parameters, which set of ALF parameters in the array corresponding to the temporal layer to which the current region belongs to replace with the applicable set of ALF parameters for the current region. In one example based on the second technique, when a set of ALF parameters are explicitly signaled for a region of a current picture, a video coder may determine, based on differences between a POC value of the current picture and POC values associated with sets of ALF parameters, which set of ALF parameters in the array to replace with the applicable set of ALF parameters for the current region.

In some examples, a separate list of selecting filters from reference picture set may be defined which is different from selecting reference pictures from reference picture set. In this case, the selected filters may be from a picture which is not included in any reference picture list of current slice/tile/picture.

In accordance with a fourth technique, the signaling of an index of a selected set/subset of filters for ALF temporal prediction may depend on a temporal layer index. A subset of filters for ALF temporal prediction is a partial set of ALF filters. For example, currently, there could be 25 ALF filters per picture. In this example, when using temporal prediction, the video coder may choose 10 instead of 25 ALF filters to be associated with a picture. In one example, truncated unary binarization method may be used to code the selected index of a set of filters and the maximum value of allowed number of sets is dependent on the temporal layer index.

For instance, in accordance with an example of the fourth technique, video encoder 20 may include, in a bitstream, a syntax element indicating an index of a selected set of ALF parameters. Similarly, video decoder 30 may obtain, from the bitstream, a syntax element indicating an index of a selected set of ALF parameters. The selected set of ALF parameters may be in one of the arrays of a type used in the first technique or the array of a type used in the second technique. In this example, video encoder 20 and/or video decoder 30 may determine, based on the selected set of ALF parameters in the array, an applicable set of ALF parameters for the current region. Video encoder 20 and/or video decoder 30 may apply, based on the applicable set of ALF parameters for the current region, an ALF filter to the current region. In this example, a format of the syntax element is dependent on a temporal layer index. For instance, a truncated unary binarization method may be used to code the syntax element and a maximum value of allowed number of sets of ALF parameters is dependent on the temporal layer index.

In some examples based on the fourth technique, the signaling of the index may further depend on the POC differences. In other words, in the context of the example of the previous paragraph, the format of the syntax element is further dependent on POC differences. For example, if the index is 0, the selected set of ALF parameters is associated with the picture with a POC value closest to a POC value of a current picture; if the index is 1, the selected set of ALF parameters is associated with the picture with a next-closest POC value to the POC value of the current picture, and so on. In this example, if two or more of the sets of ALF parameters in the array or arrays are associated with pictures having the same POC distance from the current picture, the sets of ALF parameters associated with pictures with lower (or, in other examples, higher) POC values are associated with lower index values.

In accordance with a fifth technique, instead of inheriting both filter coefficients and class merging information, it is proposed that only the class merging information may be inherited. That is, the filter indices for different classes could be inherited from previously coded information. Alternatively, furthermore, separate arrays may be allocated with one array to record the filter indices for each class and the other to record the filter coefficients.

Thus, in one example in accordance with the fifth technique, a video coder may store, in a plurality of arrays, sets of ALF parameters used in applying ALF filters to samples of pictures of the video data decoded prior to the current picture, each respective array of the plurality of arrays corresponding to a respective different temporal layer. In this example, the video coder may determine, from the set of ALF parameters in the array corresponding to the temporal layer to which the current region belongs or corresponding to a lower temporal layer than the temporal layer to which the current region belongs, class merging information and not filter coefficients.

Furthermore, in some examples, the video coder may store, in a second plurality of arrays, sets of filter coefficients used in applying ALF filters to samples of pictures of the video data decoded prior to a current picture, each respective array of the second plurality of arrays corresponding to a respective different temporal layer. As part of determining the applicable set of ALF parameters for the current region, the video coder may determine, based on a set of filter coefficients in one of the arrays of the second plurality of arrays corresponding to the temporal layer to which the current region belongs or corresponding to a lower temporal layer than the temporal layer to which the current region belongs and based on the set of ALF parameters in an array in the first plurality of arrays corresponding to the temporal layer to which the current region belongs or corresponding to a lower temporal layer than the temporal layer to which the current region belongs, the applicable set of ALF parameter.

In one example in accordance with the fifth technique, a video coder may store, in an array, sets of ALF parameters used in applying ALF filters to samples of pictures of the video data decoded prior to the current picture. In this example, the video coder may determine, from the set of ALF parameters in the array whose associated temporal layer index indicates the temporal layer to which the current region belongs or a temporal layer lower than the temporal layer to which a current region belongs, class merging information and not filter coefficients.

Furthermore, in some examples, the video coder may store, in a second array, sets of filter coefficients used in applying ALF filters to samples of pictures of the video data decoded prior to the current picture. In such examples, the video coder may store, in the second array, temporal layer indexes associated with the sets of filter coefficients. A temporal layer index associated with a set of filter coefficients indicates a temporal layer of a region in which the set of ALF parameters was used to apply an ALF filter. As part of determining the applicable set of ALF parameters for the current region, the video coder may determine, based on a set of filter coefficients in one of the arrays of the second plurality of arrays corresponding to the temporal layer to which the current region belongs or corresponding to a lower temporal layer than the temporal layer to which the current region belongs and based on the set of ALF parameters in an array in the first plurality of arrays corresponding to the temporal layer to which the current region belongs or corresponding to a lower temporal layer than the temporal layer to which the current region belongs, the applicable set of ALF parameters for the current region.

In accordance with a sixth technique, instead of inheriting both filter coefficients and class merging information, it is proposed that only the filter coefficients may be inherited. That is, for current slice/picture, the relationship between class index and filter index may be further signaled even temporal prediction is used.

Thus, in accordance with an example of the sixth technique, a video coder may store, in a plurality of arrays, sets of ALF parameters used in applying ALF filters to samples of pictures of the video data decoded prior to the current picture. Each respective array of the plurality of arrays corresponds to a respective different temporal layer. In this example, as part of determining an applicable set of ALF parameters for the current region, the video coder may determine, from the set of ALF parameters in the array corresponding to the temporal layer to which the current region belongs or corresponding to a lower temporal layer than the temporal layer to which the current region belongs, filter coefficients and not class merging information.

Furthermore, in some examples, the video coder may store, in a second plurality of arrays, sets of class merging information used in applying ALF filters to samples of pictures of the video data decoded prior to the current picture. Each respective array of the second plurality of arrays corresponds to a respective different temporal layer. As part of determining the applicable set of ALF parameters for the current region, the video coder may determine, based on a set of class merging information in one of the arrays of the second plurality of arrays corresponding to the temporal layer to which the current region belongs or corresponding to a lower temporal layer than the temporal layer to which the current region belongs and based on the set of ALF parameters in an array in the first plurality of arrays corresponding to the temporal layer to which the current region belongs or corresponding to a lower temporal layer than the temporal layer to which the current region belongs, the applicable set of ALF parameter.

In accordance with another example of the sixth technique, a video coder may store, in an array, sets of ALF parameters used in applying ALF filters to samples of pictures of the video data decoded prior to the current picture. In this example, the video coder may determine, from the set of ALF parameters in the array whose associated temporal layer index indicates the temporal layer to which the current region belongs or a temporal layer lower than the temporal layer to which the current region belongs, filter coefficients and not class merging information.

Furthermore, in some examples, the video coder may store, in a second array, sets of class merging information used in applying ALF filters to samples of pictures of the video data decoded prior to the current picture. In this example, the video coder may also store, in the second array, temporal layer indexes associated with the sets of class merging information. A temporal layer index associated with a set of filter coefficients indicates a temporal layer of a region in which the set of ALF parameters was used to apply an ALF filter. As part of determining the applicable set of ALF parameters for the current region, the video coder may determine, based on a set of filter coefficients in one of the arrays of the second plurality of arrays corresponding to the temporal layer to which the current region belongs or corresponding to a lower temporal layer than the temporal layer to which the current region belongs and based on the set of ALF parameters in an array in the first plurality of arrays corresponding to the temporal layer to which the current region belongs or corresponding to a lower temporal layer than the temporal layer to which the current region belongs, the applicable set of ALF parameters for the current region.

In accordance with a seventh technique, even when temporal prediction is used, the differences between selected stored filters and the derived filter may be further signaled. In one example, the current design for signaling temporal prediction enabling flag and index of a set of filters may be still used. In addition, a flag may be used to indicate whether to signal the filter differences or not. If yes, the differences may be further signaled. In some examples, filters from previously coded frames or slices may be added and treated as part of fixed filters. In this case, the size of fixed filters and coefficients of fixed filters may be adaptively changed. Alternatively, furthermore, in some examples, when a filter of a set is added to the fixed filters, pruning shall be applied to avoid duplications.

In an example in accordance with the seventh technique, video encoder 20 may determine, based on a selected set of ALF parameters in an array corresponding to the temporal layer to which the current region belongs, an applicable set of ALF parameters for the current region. Alternatively, in this example, video encoder 20 may determine, based on a selected set of ALF parameters in the array whose associated temporal layer index indicates the temporal layer to which the current region belongs, an applicable set of ALF parameters for the current region. In either case, video encoder 20 may include, in the bitstream, an indication of a difference between the selected set of ALF parameters and the applicable set of ALF parameters for the current region. In some examples, video encoder 20 may include, in the bitstream, a syntax element indicating whether the bitstream includes the indication of the difference.

In another example in accordance with the seventh technique, video decoder 30 may determine, based on a selected set of ALF parameters in an array corresponding to the temporal layer to which the current region belongs, an applicable set of ALF parameters for the current region. Alternatively, in this example, video decoder 30 may determine, based on a selected set of ALF parameters in the array whose associated temporal layer index indicates the temporal layer to which the current region belongs, an applicable set of ALF parameters for the current region. In either case, video decoder 30 may obtain, from the bitstream, an indication of a difference between the selected set of ALF parameters and the applicable set of ALF parameters for the current region. In this example, as part of determining the applicable set of ALF parameters for the current region, video decoder 30 may determine, based on the selected set of ALF parameters and the difference, the applicable set of ALF parameters for the current region. In some examples, video decoder 30 may obtain, from the bitstream, a syntax element indicating whether the bitstream includes the indication of the difference.

In accordance with an eighth technique, one or more sets of ALF filters may be stored in parameter sets (e.g., sequence parameter sets or picture parameter sets) so that pictures even in different coded video sequences may use them. To avoid error resilience problems or random access problems, it is disallowed to update the sets of ALF filters in parameter sets using ALF filters signaled in slice headers. For example, when coding a bitstream, a video coder may store, in an array, sets of ALF filters specified in a parameter set of the bitstream. In this example, slice headers may include ALF parameters defining additional ALF filters or filter differences. A slice header is a part of a coded slice (or coded slice segment) containing the data elements pertaining to the first or all coding tree units represented in the slice (or slice segment).

Figure 7:
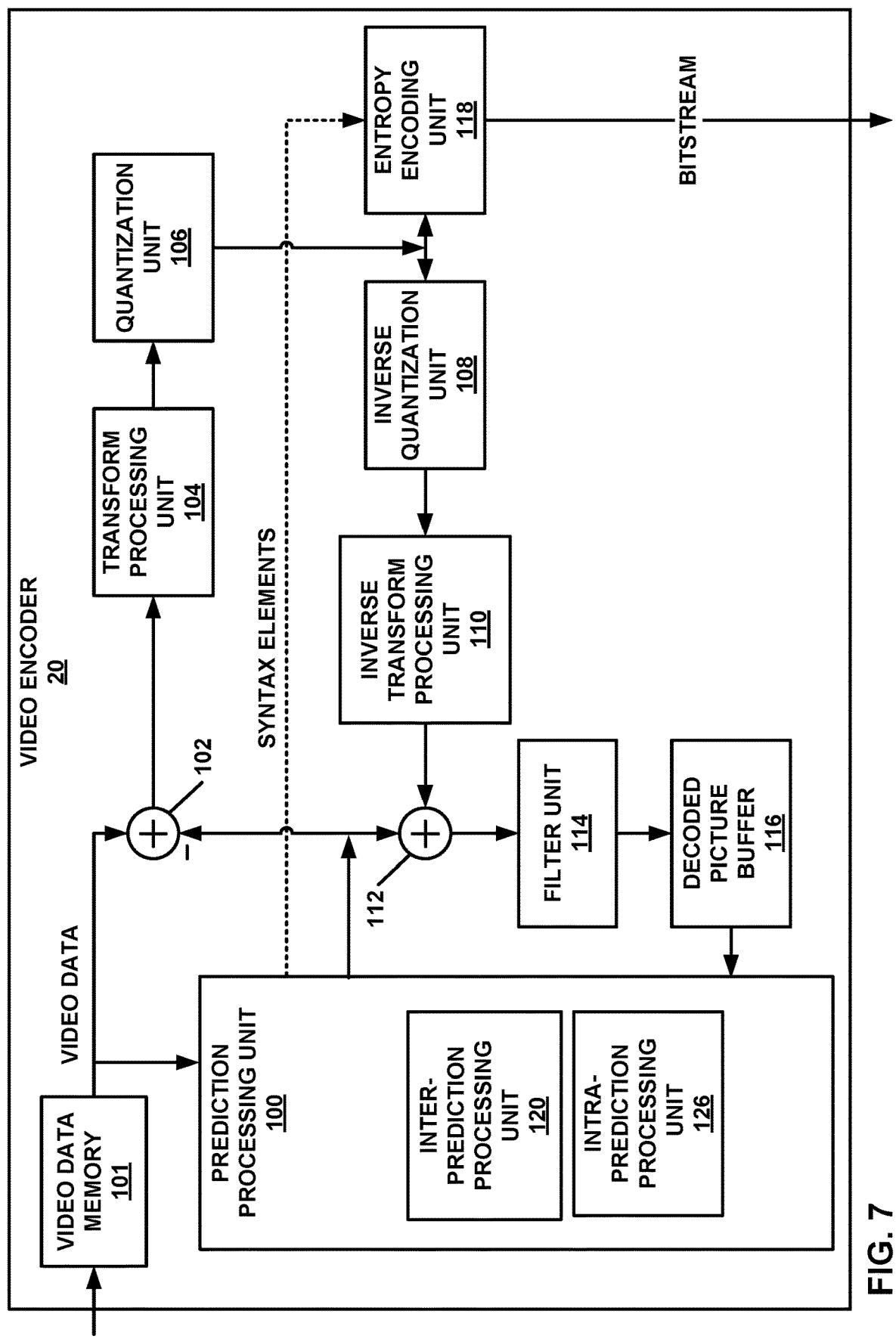
FIG. 7 is a block diagram illustrating an example video encoder that may implement one or more techniques described in this disclosure.

FIG. 7 is a block diagram illustrating an example video encoder 20 that may implement the techniques of this disclosure. FIG. 7 is provided for purposes of explanation and should not be considered limiting of the techniques as broadly exemplified and described in this disclosure. The techniques of this disclosure may be applicable to various coding standards or methods.

Processing circuitry includes video encoder 20, and video encoder 20 is configured to perform one or more of the example techniques described in this disclosure. For instance, video encoder 20 includes integrated circuitry, and the various units illustrated in FIG. 5 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 7 may be software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

In the example of FIG. 7, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components. Video data memory 101 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU. As part of generating the predictive data for a PU, inter-prediction processing unit 120 performs inter prediction on the PU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may partition the residual blocks of a CU into transform blocks of TUs of the CU. For instance, transform processing unit 104 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add samples of the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Filter unit 114 may perform the filter techniques of this disclosure. For example, filter unit 114 may store, in a plurality of arrays, sets of ALF parameters used in applying ALF filters to samples of pictures of the video data decoded prior to the current picture. In this example, each respective array of the plurality of arrays corresponds to a respective different temporal layer. Furthermore, in this example, filter unit 114 may determine, based on a selected set of ALF parameters in one of the arrays corresponding to the temporal layer to which the current region belongs, an applicable set of ALF parameters for the current region. In this example, filter unit 114 may apply, based on the applicable set of ALF parameters for the current region, adaptive loop filtering to one or more blocks in the current region.

In another example, filter unit 114 may store, in an array (e.g., array 70 of FIG. 6), sets of ALF parameters used in applying ALF filters to samples of pictures of the video data decoded prior to the current picture. Additionally, filter unit 114 may store, in the array, temporal layer indexes associated with the sets of ALF parameters. A temporal layer index associated with a set of ALF parameters indicates a temporal layer of a region in which the set of ALF parameters was used to apply an ALF filter. Furthermore, in this example, filter unit 114 may determine, based on a selected set of ALF parameters in the array whose associated temporal layer index indicates the temporal layer to which the current region belongs or a temporal layer lower than the temporal layer to which the current region belongs, an applicable set of ALF parameters for the current region. In this example, filter unit 114 may apply, based on the applicable set of ALF parameters for the current region, adaptive loop filtering to one or more blocks in the current region.

Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents values of transform coefficients for a CU.

Figure 8:
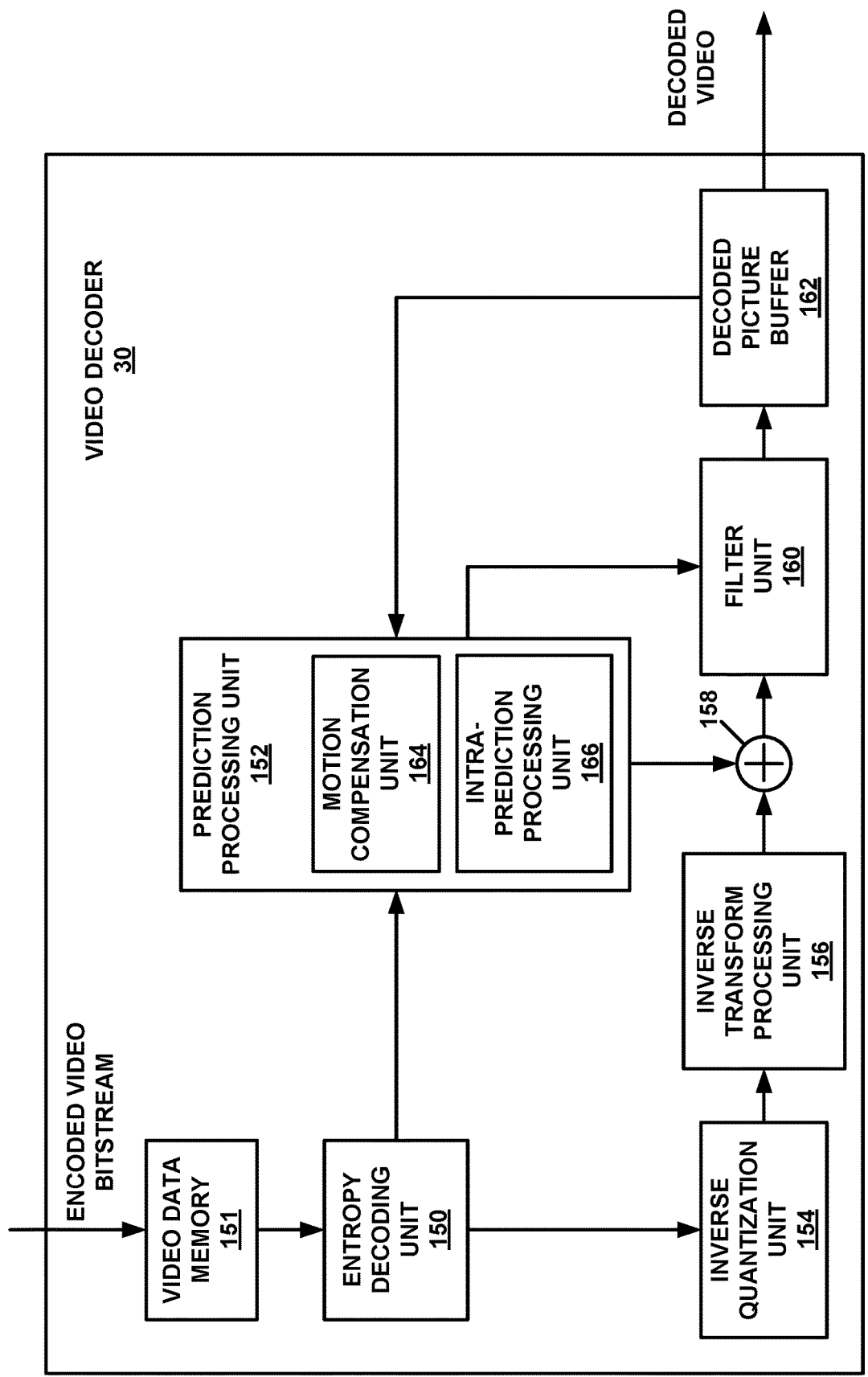
FIG. 8 is a block diagram illustrating an example video decoder that may implement one or more techniques described in this disclosure.

FIG. 8 is a block diagram illustrating an example video decoder 30 that is configured to implement the techniques of this disclosure. FIG. 8 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Processing circuitry includes video decoder 30, and video decoder 30 is configured to perform one or more of the example techniques described in this disclosure. For instance, video decoder 30 includes integrated circuitry, and the various units illustrated in FIG. 8 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 8 may be software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

In the example of FIG. 8, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

Inverse quantization unit 154 may perform particular techniques of this disclosure. For example, for at least one respective quantization group of a plurality of quantization groups within a CTB of a CTU of a picture of the video data, inverse quantization unit 154 may derive, based at least in part on local quantization information signaled in the bitstream, a respective quantization parameter for the respective quantization group. Additionally, in this example, inverse quantization unit 154 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 156, reconstruction unit 158, and filter unit 160) may reconstruct, based on inverse quantized transform coefficients of the transform block, a coding block of the CU.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Filter unit 160 may perform the filter techniques of this disclosure. For example, filter unit 160 may store, in a plurality of arrays, sets of ALF parameters used in applying ALF filters to samples of pictures of the video data decoded prior to a current picture. In this example, each respective array of the plurality of arrays corresponds to a respective different temporal layer. For instance, for each respective array of a plurality of arrays that correspond to different temporal layers, filter unit 160 may store, in the respective array, sets of ALF parameters used in applying ALF filters to samples of regions of pictures of the video data that are decoded prior to the current region and that are in the temporal layer corresponding to the respective array or a lower temporal layer than the temporal layer corresponding to the respective array. In this example, filter unit 160 may determine, based on a selected set of ALF parameters in the array corresponding to the temporal layer to which the current region belongs, an applicable set of ALF parameters for the current region. Furthermore, in this example, filter unit 160 may apply, based on the applicable set of ALF parameters for the current region, an ALF filter to one or more blocks in the current region.

In another example, filter unit 160 stores, in an array, sets of ALF parameters used in applying ALF filters to samples of pictures of the video data decoded prior to a current picture. Furthermore, in this example, filter unit 160 stores, in the array, temporal layer indexes associated with the sets of ALF parameters. A temporal layer index associated with a set of ALF parameters indicates a temporal layer of a region in which the set of ALF parameters was used to apply an ALF filter. In this example, filter unit 160 may determine, based on a selected set of ALF parameters in the array whose associated temporal layer index indicates the temporal layer to which the current region belongs, an applicable set of ALF parameters for the current region. In this example, filter unit 160 may apply, based on the applicable set of ALF parameters for the current region, an ALF filter to one or more blocks of the current region.

Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Certain aspects of this disclosure have been described with respect to extensions of the HEVC standard for purposes of illustration. However, the techniques described in this disclosure may be useful for other video coding processes, including other standard or proprietary video coding processes not yet developed.

FIG. 9 is a flowchart illustrating an example operation of video encoder 20, in accordance with the first technique of this disclosure. The flowcharts of this disclosure are provided as examples. In other examples, actions may be performed in different orders, or operations may include more, fewer, or different actions.

In the example of FIG. 9, video encoder 20 generates a bitstream that includes an encoded representation of a current picture of the video data (200). A current region (e.g., a current slice or other unit) of the current picture is associated with a temporal index indicating a temporal layer to which the current region belongs. Video encoder 20 may generate the bitstream in accordance with any of the examples described elsewhere in this disclosure, such as the example of FIG. 5.

Additionally, video encoder 20 reconstructs the current picture (202). For instance, video encoder 20 may reconstruct a block of the current picture by adding samples of reconstructed residual blocks to corresponding samples from one or more predictive blocks to produce reconstructed blocks. By reconstructing blocks in this way, video encoder 20 may reconstruct the coding blocks of the current picture.

Furthermore, for each respective array of a plurality of arrays that correspond to different temporal layers, video encoder 20 may store, in the respective array (e.g., one of arrays 60 of FIG. 5), sets of ALF parameters used in applying ALF filters to samples of regions of pictures of the video data that are decoded prior to the current region and that are in the temporal layer corresponding to the respective array or a lower temporal layer than the temporal layer corresponding to the respective array (204). Each set of ALF parameters may include a set of filter coefficients and/or a set of ALF class merging information.

Video encoder 20 determines, based on a selected set of ALF parameters in one of the arrays corresponding to the temporal layer to which the current region belongs, an applicable set of ALF parameters for the current region (206). For example, video encoder 20 may select the selected set of ALF parameters by using a rate-distortion analysis of the sets of ALF parameters in the array corresponding to the temporal layer to which the current region belongs. In some examples, the applicable set of ALF parameters for the current region may be the same as the selected set of ALF parameters. In some examples, video encoder 20 may include, in the bitstream, an indication of a difference between the selected set of ALF parameters and the applicable set of ALF parameters for the current region.

Video encoder 20 may then apply, based on the applicable set of ALF parameters for the current region, adaptive loop filtering to the current region (208). When applying adaptive loop filtering to the current region, video encoder 20 may apply an ALF filter to one or more, but not necessarily all, of the blocks in the current region. For example, video encoder 20 may divide the current region into blocks (e.g., 4×4 blocks). In this example, for each of the blocks, video encoder 20 may determine (e.g., based on a direction and activity of the block) a corresponding category for the block. In this example, the applicable set of ALF parameters for the current region may include filter coefficients of an ALF filter of the category for the block. In this example, video encoder 20 may then apply the ALF filter to the block.

After applying the adaptive loop filtering to the current region, video encoder 20 uses the current region for prediction of a subsequent picture of the video data (210). For example, video encoder 20 may use the current region for inter prediction of a block of the subsequent picture.

FIG. 10 is a flowchart illustrating an example operation of video decoder 30, in accordance with the first technique of this disclosure. In the example of FIG. 10, video decoder 30 receives a bitstream that includes an encoded representation of a current picture of the video data (250). A current region of the current picture is associated with a temporal index indicating a temporal layer to which the current region belongs.

Furthermore, video decoder 30 reconstructs the current picture (252). Video decoder 30 may reconstruct the current picture in accordance with any of the examples provided elsewhere in this disclosure. For example, video decoder 30 may reconstruct a block of the current picture by adding samples of reconstructed residual blocks to corresponding samples from one or more predictive blocks to produce reconstructed blocks. By reconstructing blocks in this way, video decoder 30 may reconstruct the coding blocks of the current picture.

Video decoder 30 also stores, in a plurality of arrays, sets of ALF parameters used in applying ALF filters to samples of pictures of the video data decoded prior to the current picture (254). Each respective array of the plurality of arrays corresponds to a respective different temporal layer. For instance, for each respective array of a plurality of arrays that correspond to different temporal layers, video decoder 30 may store, in the respective array (e.g., one of arrays 60 of FIG. 5), sets of ALF parameters used in applying ALF filters to samples of regions of pictures of the video data that are decoded prior to the current region and that are in the temporal layer corresponding to the respective array or a lower temporal layer than the temporal layer corresponding to the respective array.

Additionally, video decoder 30 may determine, based on a selected set of ALF parameters in the array corresponding to the temporal layer to which the current region belongs, an applicable set of ALF parameters for the current region (256). For example, video decoder 30 may obtain, from the bitstream, an index indicating the selected set of ALF parameters in the array corresponding to the temporal layer to which the current region belongs. In some examples, the applicable set of ALF parameters for the current region may be the same as the selected set of ALF parameters. In some examples, video decoder 30 may obtain, from the bitstream, an indication of a difference between the selected set of ALF parameters and the applicable set of ALF parameters for the current region.

Video decoder 30 may then apply, based on the applicable set of ALF parameters for the current region, adaptive loop filtering to the current region (258). When applying adaptive loop filtering to the current region, video decoder 30 may apply an ALF filter to one or more, but not necessarily all, of the blocks in the current region. For example, video decoder 30 may divide the current region into blocks (e.g., 4×4 blocks). In this example, for each of the blocks, video decoder 30 may determine (e.g., based on a direction and activity of the block) a corresponding category for the block. In this example, the applicable set of ALF parameters for the current region may include filter coefficients of an ALF filter of the category for the block. In this example, video decoder 30 may then apply the ALF filter to the block.

FIG. 11 is a flowchart illustrating an example operation of video encoder 20 in accordance with the second technique of this disclosure. In the example of FIG. 11, video encoder 20 generates a bitstream that includes an encoded representation of a current picture of the video data (300). A current region (e.g., a current slice or other unit) of the current picture is associated with a temporal index indicating a temporal layer to which the current region belongs. Video encoder 20 may generate the bitstream in accordance with any of the examples described elsewhere in this disclosure, such as the example of FIG. 5.

Furthermore, video encoder 20 may reconstruct the current picture (302). For instance, video encoder 20 may reconstruct a block of the current picture by adding samples of reconstructed residual blocks to corresponding samples from one or more predictive blocks to produce reconstructed blocks. By reconstructing blocks in this way, video encoder 20 may reconstruct the coding blocks of the current picture.

Video encoder 20 stores, in an array (e.g., array 70 of FIG. 6), sets of ALF parameters used in applying ALF filters to samples of pictures of the video data decoded prior to the current picture (304). Additionally, video encoder 20 stores, in the array, temporal layer indexes associated with the sets of ALF parameters (306). A temporal layer index associated with a set of ALF parameters indicates a temporal layer of a region in which the set of ALF parameters was used to apply an ALF filter.

Furthermore, video encoder 20 determines, based on a selected set of ALF parameters in the array whose associated temporal layer index indicates the temporal layer to which the current region belongs or a temporal layer lower than the temporal layer to which the current region belongs, an applicable set of ALF parameters for the current region (308). For example, video encoder 20 may select the selected set of ALF parameters by using a rate-distortion analysis of the sets of ALF parameters in the array. In some examples, the applicable set of ALF parameters for the current region may be the same as the selected set of ALF parameters. In some examples, video encoder 20 may include, in the bitstream, an indication of a difference between the selected set of ALF parameters and the applicable set of ALF parameters for the current region.

Video encoder 20 applies, based on the applicable set of ALF parameters for the current region, an ALF to the current region (310). Video encoder 20 may apply the ALF filter to the current region in accordance with any of the examples provided elsewhere in this disclosure.

After applying the ALF filter to the current region, video encoder 20 uses the current region for prediction of a subsequent picture of the video data (312). For example, video encoder 20 may use the current region for inter prediction of a block of the subsequent picture.

FIG. 12 is a flowchart illustrating an example operation of video decoder 30 in accordance with a technique of this disclosure. In the example of FIG. 12, video decoder 30 receives a bitstream that includes an encoded representation of a current picture of the video data (350). A current region (e.g., a current slice or other unit) of the current picture is associated with a temporal index indicating a temporal layer to which the current region belongs.

Video decoder 30 may then reconstruct the current picture (352). Video decoder 30 may reconstruct the current picture in accordance with any of the examples provided elsewhere in this disclosure. For example, video decoder 30 may reconstruct a block of the current picture by adding samples of reconstructed residual blocks to corresponding samples from one or more predictive blocks to produce reconstructed blocks. By reconstructing blocks in this way, video decoder 30 may reconstruct the coding blocks of the current picture.

In the example of FIG. 12, video decoder 30 stores, in an array, sets of ALF parameters used in applying ALF filters to samples of pictures of the video data decoded prior to the current picture (354). Furthermore, video decoder 30 stores, in the array, temporal layer indexes associated with the sets of ALF parameters (356). A temporal layer index associated with a set of ALF parameters indicates a temporal layer of a region in which the set of ALF parameters was used to apply an ALF filter.

Video decoder 30 may determine, based on a selected set of ALF parameters in the array whose associated temporal layer index indicates the temporal layer to which the current region belongs, an applicable set of ALF parameters for the current region (358). For example, video decoder 30 may obtain, from the bitstream, an index indicating the selected set of ALF parameters in the array. In some examples, the applicable set of ALF parameters for the current region may be the same as the selected set of ALF parameters. In some examples, video decoder 30 may obtain, from the bitstream, an indication of a difference between the selected set of ALF parameters and the applicable set of ALF parameters for the current region.

Video decoder 30 then applies, based on the applicable set of ALF parameters for the current region, an ALF filter to the current region (360). Video decoder 30 may apply the ALF filter to the current region in accordance with any of the examples provided elsewhere in this disclosure.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving a bitstream that includes an encoded representation of a current picture of the video data, wherein a current region of the current picture is associated with a temporal index indicating a temporal layer to which the current region belongs;
reconstructing the current picture;
allocating a plurality of arrays, each of the arrays corresponding to a different temporal index;
for each respective array of the plurality of arrays where there are one or more lower temporal layers than the temporal layer indicated by the temporal index corresponding to the respective array, storing, in the respective array, (i) sets of adaptive loop filtering (ALF) parameters used in applying ALF filters to samples of regions of pictures of the video data that are decoded prior to the current region and that are in a temporal layer indicated by the temporal index corresponding to the respective array, and (ii) sets of ALF parameters used in applying ALF filters to samples of regions of pictures of the video data that are decoded prior to the current region and that are in a lower temporal layer than the temporal layer indicated by the temporal index corresponding to the respective array;
determining, based on a selected set of ALF parameters in the array corresponding to the temporal index indicating the temporal layer to which the current region belongs, an applicable set of ALF parameters for the current region; and
applying, based on the applicable set of ALF parameters for the current region, adaptive loop filtering to the current region.

2. The method of claim 1, wherein at least two of the plurality of arrays include different numbers of sets of ALF parameters.

3. The method of claim 1, further comprising: storing, in at least one of the array corresponding to the temporal index indicating the temporal layer to which the current region belongs or the arrays of the plurality of arrays corresponding to higher temporal layers than the temporal layer to which the current region belongs, the applicable set of ALF parameters for the current region if the applicable set of ALF parameters for the current region has not yet been stored in the array corresponding to the temporal index indicating the temporal layer to which the current region belongs.

4. The method of claim 3, wherein storing the applicable set of ALF parameters for the current region comprises determining, based on differences between a Picture Order Count (POC) value of the current picture and POC values associated with sets of ALF parameters, which set of ALF parameters in the array corresponding to the temporal index indicating the temporal layer to which the current region belongs to replace with the applicable set of ALF parameters for the current region.

5. The method of claim 1, wherein it is required that, when determining the applicable set of ALF parameters for the current region, a POC value associated with the applicable set of ALF parameters for the current region is equal to a POC value of a reference picture in a reference picture list of the current picture.

6. The method of claim 1, further comprising:
obtaining, from the bitstream, a syntax element indicating an index of the selected set of ALF parameters,
wherein determining the applicable set of ALF parameters for the current region comprises determining, based on the syntax element, the selected set of ALF parameters, and
wherein a format of the syntax element is dependent on a temporal index.

7. The method of claim 1, wherein determining the applicable set of ALF parameters for the current region comprises determining, from the set of ALF parameters in the array corresponding to the temporal index indicating the temporal layer to which the current region belongs, class merging information and not filter coefficients.

8. The method of claim 1, wherein determining the applicable set of ALF parameters for the current region comprises determining, from the set of ALF parameters in the array corresponding to the temporal index indicating the temporal layer to which the current region belongs, filter coefficients and not class merging information.

9. The method of claim 1, further comprising:
obtaining, from the bitstream, an indication of a difference between the selected set of ALF parameters and the applicable set of ALF parameters for the current region,
wherein determining the applicable set of ALF parameters for the current region comprises determining, based on the selected set of ALF parameters and the difference, the applicable set of ALF parameters for the current region.

10. A method of encoding video data, the method comprising:
generating a bitstream that includes an encoded representation of a current picture of the video data, wherein a current region of the current picture is associated with a temporal index indicating a temporal layer to which the current region belongs;
reconstructing the current picture;
allocating a plurality of arrays, each of the arrays corresponding to a different temporal index;
for each respective array of the plurality of arrays where there are one or more lower temporal layers than the temporal layer indicated by the temporal index corresponding to the respective array, storing, in the respective array, (i) sets of adaptive loop filtering (ALF) parameters used in applying ALF filters to samples of regions of pictures of the video data that are decoded prior to the current region and that are in a temporal layer indicated by the temporal index corresponding to the respective array, and (ii) sets of ALF parameters used in applying ALF filters to samples of regions of pictures of the video data that are decoded prior to the current region and that are in a lower temporal layer than the temporal layer indicated by the temporal index corresponding to the respective array;
determining, based on a selected set of ALF parameters in one of the arrays corresponding to the temporal index indicating the temporal layer to which the current region belongs, an applicable set of ALF parameters for the current region;
applying, based on the applicable set of ALF parameters for the current region, adaptive loop filtering to the current region; and
after applying the adaptive loop filtering to the current region, using the current region for prediction of a subsequent picture of the video data.

11. The method of claim 10, wherein at least two of the plurality of arrays include different numbers of sets of ALF parameters.

12. The method of claim 10, further comprising: storing, in at least one of the array corresponding to the temporal index indicating the temporal layer to which the current region belongs or the arrays of the plurality of arrays corresponding to higher temporal layers than the temporal layer to which the current region belongs, the applicable set of ALF parameters for the current region if the applicable set of ALF parameters for the current region has not yet been stored in the array corresponding to the temporal layer to which the current region belongs.

13. The method of claim 12, wherein storing the applicable set of ALF parameters for the current region comprises determining, based on differences between a Picture Order Count (POC) value of the current picture and POC values associated with sets of ALF parameters, which set of ALF parameters in the array corresponding to the temporal index indicating the temporal layer to which the current region belongs to replace with the applicable set of ALF parameters for the current region.

14. The method of claim 10, wherein it is required that, when determining the applicable set of ALF parameters for the current region, a POC value associated with the applicable set of ALF parameters for the current region is equal to a POC value of a reference picture in a reference picture list of the current picture.

15. The method of claim 10, further comprising including, in the bitstream, a syntax element indicating an index of the selected set of ALF parameters.

16. The method of claim 10, wherein determining the applicable set of ALF parameters for the current region comprises determining, from the set of ALF parameters in the array corresponding to the temporal index indicating the temporal layer to which the current region belongs, class merging information and not filter coefficients.

17. The method of claim 10, wherein determining the applicable set of ALF parameters for the current region comprises determining, from the set of ALF parameters in the array corresponding to the temporal index indicating the temporal layer to which the current region belongs, filter coefficients and not class merging information.

18. The method of claim 10, further comprising:
including, in the bitstream, an indication of a difference between the selected set of ALF parameters and the applicable set of ALF parameters for the current region.

19. A device for decoding video data, the device comprising:
one or more storage media configured to store the video data; and
one or more processors configured to:
receive a bitstream that includes an encoded representation of a current picture of the video data, wherein a current region of the current picture is associated with a temporal index indicating a temporal layer to which the current region belongs;
reconstruct the current picture;
allocate a plurality of arrays, each of the arrays corresponding to a different temporal index:
for each respective array of the plurality of arrays where there are one or more lower temporal layers than the temporal layer indicated by the temporal index corresponding to the respective array, store, in the respective array, (i) sets of adaptive loop filtering (ALF) parameters used in applying ALF filters to samples of regions of pictures of the video data that are decoded prior to the current region and that are in the temporal layer indicated by the temporal index corresponding to the respective array, and (ii) sets of ALF parameters used in applying ALF filters to samples of regions of pictures of the video data that are decoded prior to the current region and that are in a lower temporal layer than the temporal layer indicated by the temporal index corresponding to the respective array;
determine, based on a selected set of ALF parameters in the array corresponding to the temporal index indicating the temporal layer to which the current region belongs, an applicable set of ALF parameters for the current region; and
apply, based on the applicable set of ALF parameters for the current region, adaptive loop filtering to the current region.

20. The device of claim 19, wherein at least two of the plurality of arrays include different numbers of sets of ALF parameters.

21. The device of claim 19, wherein the one or more processors are further configured to store, in at least one of the array corresponding to the temporal index indicating the temporal layer to which the current region belongs or the arrays of the plurality of arrays corresponding to higher temporal layers than the temporal layer to which the current region belongs, the applicable set of ALF parameters for the current region if the applicable set of ALF parameters for the current region has not yet been stored in the array corresponding to the temporal index indicating the temporal layer to which the current region belongs.

22. The device of claim 21, wherein the one or more processors are configured such that, as part of storing the applicable set of ALF parameters for the current region, the one or more processors determine, based on differences between a Picture Order Count (POC) value of the current picture and POC values associated with sets of ALF parameters, which set of ALF parameters in the array corresponding to the temporal index indicating the temporal layer to which the current region belongs to replace with the applicable set of ALF parameters for the current region.

23. The device of claim 19, wherein it is required that, when determining the applicable set of ALF parameters for the current region, a POC value associated with the applicable set of ALF parameters for the current region is equal to a POC value of a reference picture in a reference picture list of the current picture.

24. The device of claim 19, wherein the one or more processors are further configured to:
obtain, from the bitstream, a syntax element indicating an index of the selected set of ALF parameters,
wherein the one or more processors are configured such that, as part of determining the applicable set of ALF parameters for the current region, the one or more processors determine, based on the syntax element, the selected set of ALF parameters, and
wherein a format of the syntax element is dependent on a temporal index.

25. The device of claim 19, wherein the one or more processors are configured such that, as part of determining the applicable set of ALF parameters for the current region, the one or more processors determine, from the set of ALF parameters in the array corresponding to the temporal index indicating the temporal layer to which the current region belongs, class merging information and not filter coefficients.

26. The device of claim 19, wherein the one or more processors are configured such that, as part of determining the applicable set of ALF parameters for the current region, the one or more processors determine, from the set of ALF parameters in the array corresponding to the temporal index indicating the temporal layer to which the current region belongs, filter coefficients and not class merging information.

27. The device of claim 19, wherein the one or more processors are further configured to:
obtain, from the bitstream, an indication of a difference between the selected set of ALF parameters and the applicable set of ALF parameters for the current region, wherein the one or more processors are configured such that, as part of determining the applicable set of ALF parameters for the current region, the one or more processors determine, based on the selected set of ALF parameters and the difference, the applicable set of ALF parameters for the current region.

28. The device of claim 19, wherein the device comprises a wireless communication device, further comprising a receiver configured to receive encoded video data.

29. The device of claim 28, wherein the wireless communication device comprises a telephone handset and wherein the receiver is configured to demodulate, according to a wireless communication standard, a signal comprising the encoded video data.

30. A device for encoding video data, the device comprising:
one or more storage media configured to store the video data; and
one or more processors configured to:
generate a bitstream that includes an encoded representation of a current picture of the video data, wherein a current region of the current picture is associated with a temporal index indicating a temporal layer to which the current region belongs;
reconstruct the current picture;
allocate a plurality of arrays, each of the arrays corresponding to a different temporal index;
for each respective array of the plurality of arrays where there are one or more lower temporal layers than the temporal layer indicated by the temporal index corresponding to the respective array, store, in the respective array, (i) sets of adaptive loop filtering (ALF) parameters used in applying ALF filters to samples of regions of pictures of the video data that are decoded prior to the current region and that are in the temporal layer indicating the temporal index corresponding to the respective array, and (ii) sets of ALF parameters used in applying ALF filters to samples of regions of pictures of the video data that are decoded prior to the current region and that are in a lower temporal layer than the temporal layer indicated by the temporal index corresponding to the respective array;
determine, based on a selected set of ALF parameters in one of the arrays corresponding to the temporal index indicating the temporal layer to which the current region belongs, an applicable set of ALF parameters for the current region;
apply, based on the applicable set of ALF parameters for the current region, adaptive loop filtering to the current region; and
after applying the adaptive loop filtering to the current region, use the current region for prediction of a subsequent picture of the video data.

31. The device of claim 30, wherein at least two of the plurality of arrays include different numbers of sets of ALF parameters.

32. The device of claim 30, wherein the one or more processors are further configured to: store, in at least one of the array corresponding to the temporal index indicating the temporal layer to which the current region belongs or the arrays of the plurality of arrays corresponding to higher temporal layers than the temporal layer to which the current region belongs, the applicable set of ALF parameters for the current region if the applicable set of ALF parameters for the current region has not yet been stored in the array.

33. The device of claim 32, wherein the one or more processors are configured such that, as part of storing the applicable set of ALF parameters for the current region, the one or more processors determine, based on differences between a POC value of the current picture and POC values associated with sets of ALF parameters, which set of ALF parameters in the array corresponding to the temporal index indicating the temporal layer to which the current region belongs to replace with the applicable set of ALF parameters for the current region.

34. The device of claim 30, wherein it is required that, when determining the applicable set of ALF parameters for the current region, a POC value associated with the applicable set of ALF parameters for the current region is equal to a POC value of a reference picture in a reference picture list of the current picture.

35. The device of claim 30, wherein the one or more processors are further configured to include, in the bitstream, a syntax element indicating an index of the selected set of ALF parameters.

36. The device of claim 30, wherein the one or more processors are configured such that, as part of determining the applicable set of ALF parameters for the current region, the one or more processors determine, from the set of ALF parameters in the array corresponding to the temporal index indicating the temporal layer to which the current region belongs, class merging information and not filter coefficients.

37. The device of claim 30, wherein the one or more processors are configured such that, as part of determining the applicable set of ALF parameters for the current region, the one or more processors determine, from the set of ALF parameters in the array corresponding to the temporal index indicating the temporal layer to which the current region belongs, filter coefficients and not class merging information.

38. The device of claim 30, wherein the one or more processors are further configured to:
include, in the bitstream, an indication of a difference between the selected set of ALF parameters and the applicable set of ALF parameters for the current region.

39. The device of claim 30, wherein the device comprises a wireless communication device, further comprising a transmitter configured to transmit encoded video data.

40. The device of claim 39, wherein the wireless communication device comprises a telephone handset and wherein the transmitter is configured to modulate, according to a wireless communication standard, a signal comprising the encoded video data.

41. A device for decoding video data, the device comprising:
means for receiving a bitstream that includes an encoded representation of a current picture of the video data, wherein a current region of the current picture is associated with a temporal index indicating a temporal layer to which the current region belongs;
means for reconstructing the current picture;

means for allocating a plurality of arrays, each of the arrays corresponding to a different temporal index;

for each respective array of the plurality of arrays where there are one or more lower temporal layers than the temporal layer indicated by the temporal index corresponding to the respective array, means for storing, in the respective array, (i) sets of adaptive loop filtering (ALF) parameters used in applying ALF filters to samples of regions of pictures of the video data that are decoded prior to the current region and that are in the temporal layer indicated by the temporal index corresponding to the respective array, and (ii) sets of ALF parameters used in applying ALF filters to samples of regions of pictures of the video data that are decoded prior to the current region and that are in a lower temporal layer than the temporal layer indicated by the temporal index corresponding to the respective array;

means for determining, based on a selected set of ALF parameters in the array corresponding to the temporal index indicating the temporal layer to which the current region belongs, an applicable set of ALF parameters for the current region; and means for applying, based on the applicable set of ALF parameters for the current region, adaptive loop filtering to the current region.

42. A device for encoding video data, the device comprising:

means for generating a bitstream that includes an encoded representation of a current picture of the video data, wherein a current region of the current picture is associated with a temporal index indicating a temporal layer to which the current region belongs;

means for reconstructing the current picture;

means for allocating a plurality of arrays, each of the arrays corresponding to a different temporal index;

for each respective array of the plurality of arrays where there are one or more lower temporal layers than the temporal layer indicated by the temporal index corresponding to the respective array, means for storing, in the respective array, (i) sets of adaptive loop filtering (ALF) parameters used in applying ALF filters to samples of regions of pictures of the video data that are decoded prior to the current region and that are in the temporal layer indicated by the temporal index corresponding to the respective array, and (ii) sets of ALF parameters used in applying ALF filters to samples of regions of pictures of the video data that are decoded prior to the current region and that are in a lower temporal layer than the temporal layer indicated by the temporal index corresponding to the respective array;

means for determining, based on a selected set of ALF parameters in one of the arrays corresponding to the temporal index indicating the temporal layer to which the current region belongs, an applicable set of ALF parameters for the current region;

means for applying, based on the applicable set of ALF parameters for the current region, adaptive loop filtering to the current region; and means for using, after applying the adaptive loop filtering to the current region, the current region for prediction of a subsequent picture of the video data.

43. A non-transitory computer-readable data storage medium storing instructions that, when executed, cause one or more processors to:

receive a bitstream that includes an encoded representation of a current picture of video data, wherein a current region of the current picture is associated with a temporal index indicating a temporal layer to which the current region belongs;

reconstruct the current picture;

allocate a plurality of arrays, each of the arrays corresponding to a different temporal index;

for each respective array of the plurality of arrays, store, in the respective array, (i) sets of adaptive loop filtering (ALF) parameters used in applying ALF filters to samples of regions of pictures of the video data that are decoded prior to the current region and that are in the temporal layer indicated by the temporal index corresponding to the respective array, and (ii) sets of ALF parameters used in applying ALF filters to samples of regions of pictures of the video data that are decoded prior to the current region and that are in a lower temporal layer than the temporal layer indicated by the temporal index corresponding to the respective array;

determine, based on a selected set of ALF parameters in the array corresponding to the temporal index indicating the temporal layer to which the current region belongs, an applicable set of ALF parameters for the current region; and apply, based on the applicable set of ALF parameters for the current region, adaptive loop filtering to the current region.

44. A non-transitory computer-readable storage medium storing instructions that, when executed, cause one or more processors to:

generate a bitstream that includes an encoded representation of a current picture of the video data, wherein a current region of the current picture is associated with a temporal index indicating a temporal layer to which the current region belongs;

reconstruct the current picture;

allocate a plurality of arrays, each of the arrays corresponding to a different temporal index;

for each respective array of the plurality of arrays where there are one or more lower temporal layers than the temporal layer indicated by the temporal index corresponding to the respective array, store, in the respective array, (i) sets of adaptive loop filtering (ALF) parameters used in applying ALF filters to samples of regions of pictures of the video data that are decoded prior to the current region and that are in the temporal layer indicated by the temporal index corresponding to the respective array, and (ii) sets of ALF parameters used in applying ALF filters to samples of regions of pictures of the video data that are decoded prior to the current region and that are in a lower temporal layer than the temporal layer indicated by the temporal index corresponding to the respective array;

determine, based on a selected set of ALF parameters in one of the arrays corresponding to the temporal index indicating the temporal layer to which the current region belongs, an applicable set of ALF parameters for the current region;

apply, based on the applicable set of ALF parameters for the current region, adaptive loop filtering to the current region; and after applying the adaptive loop filtering to the current region, use the current region for prediction of a subsequent picture of the video data.

* * * * *